United States Patent
Krall et al.

(10) Patent No.: US 11,360,329 B2
(45) Date of Patent: Jun. 14, 2022

(54) NEGATIVE POWER EYE-STRAIN REDUCING LENS

(71) Applicant: Neurolens, Inc., Coppell, TX (US)

(72) Inventors: Jeffrey P. Krall, Mitchell, SD (US); Aric Plumley, Huntington Beach, CA (US)

(73) Assignee: Neurolens, Inc., Costa Mesa, CA (US)

( * ) Notice: Subject to any disclaimer, the term of this patent is extended or adjusted under 35 U.S.C. 154(b) by 256 days.

(21) Appl. No.: 15/859,660

(22) Filed: Dec. 31, 2017

(65) Prior Publication Data
US 2019/0204619 A1 Jul. 4, 2019

(51) Int. Cl.
G02C 7/06 (2006.01)
G02C 7/02 (2006.01)
G02C 7/14 (2006.01)

(52) U.S. Cl.
CPC ............ *G02C 7/068* (2013.01); *G02C 7/021* (2013.01); *G02C 7/022* (2013.01); *G02C 7/06* (2013.01); *G02C 7/061* (2013.01); *G02C 7/063* (2013.01); *G02C 7/065* (2013.01); *G02C 7/066* (2013.01); *G02C 7/14* (2013.01)

(58) Field of Classification Search
CPC ............................ G02C 7/02; G02C 7/06–068
See application file for complete search history.

(56) References Cited

U.S. PATENT DOCUMENTS

| | | |
|---|---|---|
| 1,594,059 A | 7/1926 | Hubbell |
| 3,245,745 A | 4/1966 | Hancock |
| 4,056,311 A | 11/1977 | Winthrop |
| 4,222,639 A | 9/1980 | Sheedy |
| 4,240,719 A | 12/1980 | Gunter et al. |
| 4,253,747 A | 3/1981 | Maitenaz |
| 4,580,882 A | 4/1986 | Nuchman et al. |

(Continued)

FOREIGN PATENT DOCUMENTS

| | | |
|---|---|---|
| CN | 1438852 A | 8/2003 |
| CN | 102314001 A | 1/2012 |

(Continued)

OTHER PUBLICATIONS

D. Meister, et al., Introduction to Ophthalmic Optics, 2008, Sixth Printing (Year: 2008).*

(Continued)

*Primary Examiner* — Christopher Stanford
(74) *Attorney, Agent, or Firm* — Gergely T. Zimanyi

(57) ABSTRACT

An eye-strain reducing lens is characterized by an x-y-z coordinate system, and includes a distance-vision region, having a negative distance-vision optical power, configured to refract a light ray, directed by a source at a distance-vision region point at a distance-vision x-distance from a center of the coordinate system, to propagate to an eye-center-representative location; and a near-vision region, having a near-vision optical power that matches the distance-vision optical power within 0.5 D, configured to refract a light ray, directed by the source at a near-vision region point at a near-vision x-distance from the center of the coordinate system, to propagate to an x-z location of the eye-center representative location at a corresponding y height; wherein the near-vision x-distance is smaller than the distance-vision x-distance.

18 Claims, 22 Drawing Sheets

(56) References Cited

U.S. PATENT DOCUMENTS

| | | | |
|---|---|---|---|
| 4,580,883 | A | 4/1986 | Shinohara |
| 4,606,626 | A | 8/1986 | Shinohara |
| 4,756,305 | A | 7/1988 | Mateik et al. |
| 4,906,090 | A | 3/1990 | Barth |
| 4,961,639 | A | 10/1990 | Lazarus |
| 5,026,151 | A | 6/1991 | Waltuck et al. |
| 5,200,859 | A | 4/1993 | Payner et al. |
| 5,204,702 | A * | 4/1993 | Shapiro ............... G02C 7/00 351/159.58 |
| 5,305,028 | A | 4/1994 | Okano |
| 5,381,191 | A | 1/1995 | Levy |
| 5,557,348 | A | 9/1996 | Umeda et al. |
| 5,724,120 | A | 3/1998 | Svochak et al. |
| 5,728,156 | A | 3/1998 | Gupta et al. |
| 5,782,894 | A | 7/1998 | Israel |
| 5,946,075 | A | 8/1999 | Horn |
| 5,969,790 | A | 10/1999 | Onufryk |
| 6,019,470 | A | 2/2000 | Mukaiyama et al. |
| 6,062,691 | A | 5/2000 | Markson |
| 6,106,819 | A | 8/2000 | Sucher |
| 6,142,624 | A | 11/2000 | Morris et al. |
| 6,318,857 | B1 | 11/2001 | Shirayanagi |
| 6,347,869 | B1 | 2/2002 | Xu et al. |
| 6,364,481 | B1 | 4/2002 | O'Connor et al. |
| 6,505,934 | B1 | 1/2003 | Menezes |
| 6,547,387 | B1 | 4/2003 | Katsantones |
| 6,579,478 | B2 | 6/2003 | Lossman et al. |
| 6,652,097 | B2 | 11/2003 | Shirayanagi |
| 6,776,486 | B2 | 8/2004 | Steele et al. |
| 6,789,898 | B2 | 9/2004 | Le Saux et al. |
| 6,871,954 | B2 | 3/2005 | Copeland |
| 6,956,682 | B2 | 10/2005 | Wooley |
| 7,104,647 | B2 | 9/2006 | Krall |
| 7,216,977 | B2 * | 5/2007 | Poulain ............... G02C 7/06 351/159.42 |
| 7,290,878 | B1 | 11/2007 | Hofeldt |
| 7,703,921 | B2 | 4/2010 | Dick et al. |
| 7,744,215 | B2 | 6/2010 | Blum et al. |
| 7,828,439 | B2 | 11/2010 | Krall |
| 7,976,157 | B2 | 7/2011 | Croft et al. |
| 8,042,940 | B2 | 10/2011 | Krall et al. |
| 8,100,529 | B2 | 1/2012 | Kozu |
| 8,287,124 | B2 | 10/2012 | Krall et al. |
| 8,376,546 | B2 | 2/2013 | Kozu |
| 8,425,034 | B2 * | 4/2013 | Wietschorke .......... G02C 7/028 351/159.42 |
| 8,967,798 | B2 * | 3/2015 | Yamakaji ............. G02C 7/02 351/159.76 |
| 9,237,843 | B1 | 1/2016 | Krall et al. |
| 9,274,351 | B2 | 3/2016 | Drobe |
| 9,298,021 | B2 | 3/2016 | Krall et al. |
| 9,664,591 | B2 * | 5/2017 | Yamakaji ........... G01M 11/0257 |
| 10,048,511 | B2 | 8/2018 | Krall et al. |
| 10,048,512 | B2 | 8/2018 | Krall et al. |
| 2002/0051116 | A1 | 5/2002 | Van Saarloos et al. |
| 2002/0099305 | A1 | 7/2002 | Fukushima et al. |
| 2006/0092375 | A1 | 5/2006 | Menezes et al. |
| 2006/0139571 | A1 | 6/2006 | Poulain et al. |
| 2006/0170863 | A1 | 8/2006 | Krall |
| 2006/0244915 | A1 | 11/2006 | Clemons et al. |
| 2007/0182923 | A1 | 8/2007 | Kitani et al. |
| 2008/0002150 | A1 * | 1/2008 | Blum ............... G02C 7/061 351/159.42 |
| 2008/0049152 | A1 | 2/2008 | Hong et al. |
| 2008/0117289 | A1 | 5/2008 | Schowengerdt et al. |
| 2008/0278676 | A1 | 11/2008 | Croft et al. |
| 2008/0297721 | A1 | 12/2008 | Gupta et al. |
| 2009/0153796 | A1 | 6/2009 | Rabner |
| 2009/0185137 | A1 | 7/2009 | Krall |
| 2009/0290121 | A1 | 11/2009 | Drobe et al. |
| 2010/0066974 | A1 | 3/2010 | Croft et al. |
| 2010/0109176 | A1 | 5/2010 | Davison |
| 2010/0271590 | A1 | 10/2010 | Kitani et al. |
| 2011/0090455 | A1 | 4/2011 | Gupta et al. |
| 2011/0317127 | A1 | 12/2011 | Suzuki et al. |
| 2012/0002163 | A1 | 1/2012 | Neal |
| 2012/0019774 | A1 | 1/2012 | Krall et al. |
| 2012/0019775 | A1 | 1/2012 | Tyrin et al. |
| 2012/0019776 | A1 | 1/2012 | Giraudet |
| 2012/0081661 | A1 | 4/2012 | Yamakaji |
| 2012/0200822 | A1 | 8/2012 | Kaga et al. |
| 2012/0229756 | A1 * | 9/2012 | Kato ............... G02C 7/068 351/159.42 |
| 2012/0250152 | A1 | 10/2012 | Larson et al. |
| 2012/0307203 | A1 | 12/2012 | Vendel et al. |
| 2013/0010097 | A1 | 1/2013 | Durnell et al. |
| 2013/0070199 | A1 * | 3/2013 | Blum ............... G02C 7/06 351/159.4 |
| 2013/0265540 | A1 | 10/2013 | Esser et al. |
| 2013/0293531 | A1 | 11/2013 | Cao et al. |
| 2013/0308099 | A1 | 11/2013 | Stack |
| 2014/0028972 | A1 | 1/2014 | Granger et al. |
| 2014/0327875 | A1 | 11/2014 | Blum et al. |
| 2014/0375949 | A1 | 12/2014 | Buehren |
| 2015/0049301 | A1 | 2/2015 | Krall et al. |
| 2015/0212338 | A1 | 7/2015 | Qi |
| 2015/0226983 | A1 | 8/2015 | Carmon et al. |
| 2015/0253587 | A1 | 9/2015 | Carmon et al. |
| 2015/0346515 | A1 | 12/2015 | Kozu |
| 2016/0073870 | A1 | 3/2016 | Bailey |
| 2017/0148215 | A1 | 5/2017 | Aksoy et al. |
| 2017/0343835 | A1 | 11/2017 | Carmon et al. |
| 2017/0351116 | A1 * | 12/2017 | Kaga ............... G02C 7/02 |
| 2017/0371181 | A1 * | 12/2017 | Kaga ............... G02C 7/02 |
| 2018/0004010 | A1 * | 1/2018 | Kaga ............... G02C 7/06 |
| 2018/0101024 | A1 | 4/2018 | Krall et al. |
| 2018/0101025 | A1 | 4/2018 | Krall et al. |
| 2018/0101026 | A1 | 4/2018 | Krall et al. |
| 2018/0136486 | A1 | 5/2018 | Macnamara |

FOREIGN PATENT DOCUMENTS

| | | |
|---|---|---|
| CN | 103815866 A | 5/2014 |
| EP | 02301422 A1 | 3/2011 |
| FR | 2 814 819 | 4/2002 |
| FR | 2 850 763 | 8/2004 |
| JP | H10-22724 | 4/1998 |
| JP | 11095175 A * | 4/1999 |
| JP | 2002253509 | 9/2002 |
| JP | 2011072431 | 4/2011 |
| JP | 2012100759 | 5/2012 |
| WO | WO 2007/068819 | 6/2007 |
| WO | WO 2008/012649 | 1/2008 |
| WO | WO 2011/067361 | 6/2011 |
| WO | WO 2012/160741 | 11/2012 |
| WO | WO-2015131399 A1 | 9/2015 |
| WO | WO 2016/007124 A1 | 1/2016 |
| WO | WO 2016/020229 | 2/2016 |
| WO | WO 2016/101204 A1 | 6/2016 |
| WO | WO-2016149416 A1 | 9/2016 |
| WO | WO 2017/131770 A1 | 8/2017 |

OTHER PUBLICATIONS

Kim, et al., "The Analysis of AC/A Ratio in Nonefractive Accommodative Esotropia Treated with Bifocal Glasses", Korean Journal Ophthalmology, vol. 26, No. 1, Published: 2012, pp. 39-44, col. 2, paragraph 2; pISSN: 1011-8942.

Wisnicki M.D., "Bifocals, Trifocals, and Progressive-Addition Lenses," American Academy of Ophthalmology, vol. XVII, No. 6, Jun. 1999.

Fogt et al., "Comparison of Fixation Disparities Obtained by Objective and Subjective Methods," Vision Res., vol. 38, No. 3, pp. 411-421.

Shapiro, "Parallel-Testing Infinity Balance Instrument and Technique for the Parallel Testing of Binocular Vision," Opt. and Vision Science, vol. 72, No. 12, 1995 pp. 916-923.

Remole et al, "Objective Measurement of Binocular Fixation Misalignment," American Journal of Optometry and Physiological Optics, vol. 63, No. 8, 1986, pp. 631-638.

Bruce J.W. Evans, "Optometric prescribing for decompensated heterophoria," Optometry in Practice, vol. 9.2, 2008, pp. 63-78.

(56) References Cited

OTHER PUBLICATIONS

Teitelbaum et al., "Effectiveness of Base in Prism for Presbyopes with Convergence Insufficiency", Optometry and Vision Science, vol. 86, No. 2, Feb. 2009, pp. 153-156.

* cited by examiner

NEGATIVE POWER EYE-STRAIN REDUCING LENS

FIELD OF INVENTION

This invention relates generally to improved spectacle lenses, in more detail to spectacle tenses that reduce eye-strain and relax convergence, and alter proprioceptive feedback.

BACKGROUND

With normal vision, an individual is able to focus at objects located at different distances. Ideally, an individual is able to focus on distant objects, referred to as distance-vision, and on near objects, referred to as near-vision. The optical system of the eye uses numerous muscles to focus for both distance-vision and for near-vision. These muscles adjust various aspects of the eye when transitioning between distance-vision and near-vision. The muscle adjustments include making subtle changes to the shape of the crystalline lens to adjust the focus of the lens, rotating the eyeballs to rotate their optical axes, and changing the size of the pupils.

Presbyopia is a natural deterioration of near vision caused by loss of flexibility in the eye's crystalline lenses as one ages. Presbyopia can be partially compensated by wearing "reading" glasses that correct near-vision refraction errors so that the eye does not have to focus as strongly when gazing al near objects. Presbyopic persons need different optical corrections for near-vision and for distance-vision. However, using two glasses and changing them with great frequency is distracting. To avoid continually exchanging eyeglasses, bifocals maybe used that offer different optical corrections for near-vision and for distance-vision. The transition between these two vision regions can be abrupt or gradual. The latter eyeglasses are called Progressive Addition Lenses (PALs). Abrupt change bifocals have a visible line separating the two vision regions, while PALs have no lines or edges visible between the regions with different dioptric powers.

In spite of all this progress, some types of vision-related discomforts still persist. One of these discomforts is related to a shift of habits in the modern, digital lifestyle. A large and increasing fraction of professions require workers to spend a large and increasing fraction of their working time focusing at close-distance digital interfaces, including computer screens and mobile devices. The same is true for the private lives of many, spending hours playing video games, texting and checking updates on cell phones, among others. All these professional and behavioral shifts rapidly increased the time people spend looking at digital screens, devices, displays, and monitors at a much closer distance than before. The increased time of the eye being trained at near-vision targets places excessive demands on the muscles involved in near-vision, often straining them beyond the comfort zone. This can lead to fatigue, discomfort, pain, or even digitally induced migraines. Up to now, there is no widely accepted consensus on the precise causation mechanism of these digital-device related visual discomforts, pains and migraines. Therefore, there is a need for glasses, or other optometric solutions than can provide relief for digital eye discomforts.

SUMMARY

To address the above needs, in some embodiments an eye-strain-reducing lens is characterized by a central normal of the eye-strain-reducing lens defining a z-axis, and a central region of the eye-strain-reducing lens defining a tangential, centered x-y plane, together defining an x-y-z coordinate system of the eye-strain-reducing lens, the eye-strain-reducing lens comprising a distance-vision region, having a negative distance-vision optical power, configured to refract a light ray, directed by a source at a distance-vision region point at a distance-vision x-distance from a center of the coordinate system, to propagate to an eye-center-representative location; and a near-vision region, having a near-vision optical power that matches the distance-vision optical power within 0.5 D, configured to refract a light ray, directed by the source at a near-vision region point at a near-vision x-distance from the center of the coordinate system, to propagate to an x-z location of the eye-center representative location at a corresponding y height; wherein the near-vision x-distance is smaller than the distance-vision x-distance.

In some embodiments, an eye-strain-reducing lens is characterized by a central normal of the eye-strain-reducing lens defines a z-axis, and a central region of the eye-strain-reducing lens defines a tangential, centered x-y plane, together defining an x-y-z coordinate system of the eye-strain-reducing lens, the eye-strain-reducing lens comprising a distance-vision region, having a negative distance-vision optical power, configured to refract a light ray directed by a source at a distance-vision region point at a distance-vision x-distance from the center of the coordinate system, to propagate to an image point, wherein the source is located on the z-axis at a source-z-distance from a center of the coordinate system; and a near-vision region, having a near-vision optical power that matches the distance-vision optical power within 0.5 D, configured to refract a light ray directed by the source at a near-vision region point at a near-vision x-distance from the center of the coordinate system to propagate to an x-z location of the image point at a corresponding y height, wherein the near-vision x-distance is smaller than the distance-vision x-distance.

DETAILED DESCRIPTION

Embodiments of the invention are placed into context by first describing the effect of regular, monovision lenses of existing spectacles on the gaze-convergence angles for near-vision. This will be followed by the description of the embodiments of the invention.

Figure 1A:
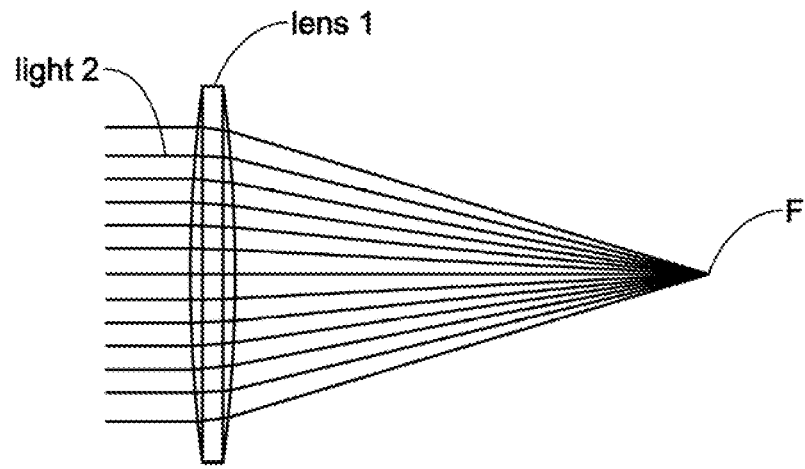
FIGS. 1A-B illustrate the refraction angle of optical lenses.

FIG. 1A illustrates how a typical, positive power monovision optical lens 1 effects incident light rays 2, or simply light 2. When parallel light rays 2 are incident on the lens 1, the lens 1 focuses them into a focus point F.

Figure 1B:
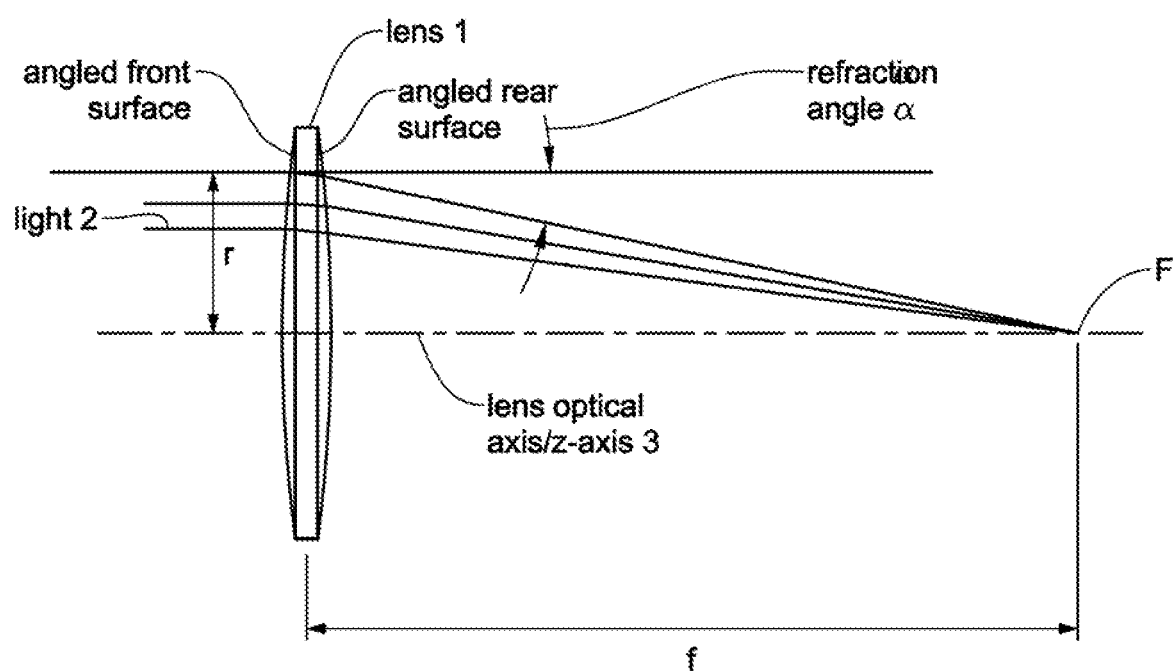

FIG. 1B zooms in on an off-center, or off-axis portion of the incident light rays 2. Visibly, the off-center, or off-axis parallel rays are refracted towards the focus point F by the angled, or curved, front surface and the angled, or curved, back surface of the lens 1 according to well-established laws of light-refraction. The overall effect of the light rays propagating through these two angled, or curved, surfaces is that they get refracted by an induced angle of refraction $\alpha$.

A negative optical power monovision lens refracts the light rays away from the optical axis, so that the source-side extensions of the rays intersect at a (virtual) focus point F. It is customary to characterize this by saying that the negative power lenses have a negative focal length.

There are different, related ways to characterize the amount of refraction by a lens region at a radial distance r from the axis. One characterization is by the refraction angle $\alpha$ itself. Another is by the tangent of this same refraction angle, expressed as a ratio of r, the radial distance of the region of the lens from a lens optical axis 3, to f, the focal distance of the lens:

$$\tan \alpha = r/f. \quad (1)$$

This relation shows that a lens of optical power of D diopters, defined as D=1/f [1/m], induces a refraction angle $\alpha$ for rays that are incident at the lens at a focal distance r from the axis 3 of the lens 1, where $\alpha$ is given by $$\tan \alpha = r^*D. \quad (2)$$

Figure 2A:
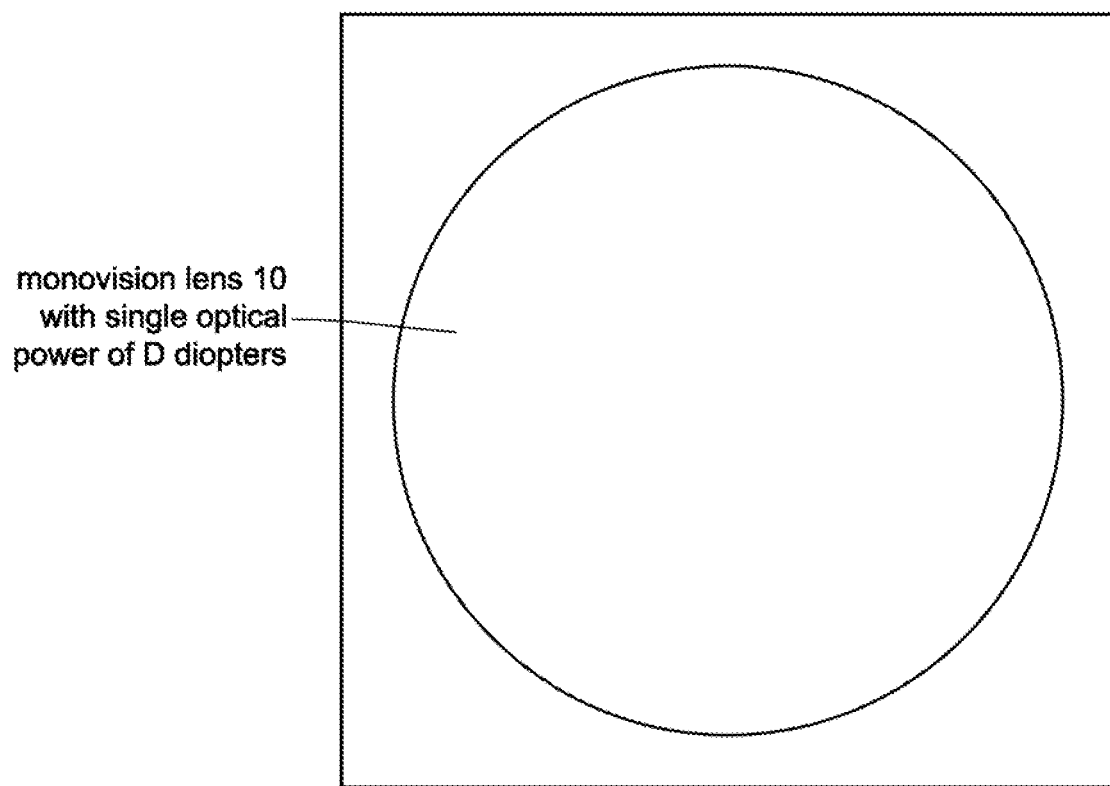
FIGS. 2A-C illustrate the refraction angles of a monovision lens.

FIG. 2A illustrates a simple monovision lens 10 with optical power D.

Figure 2B:
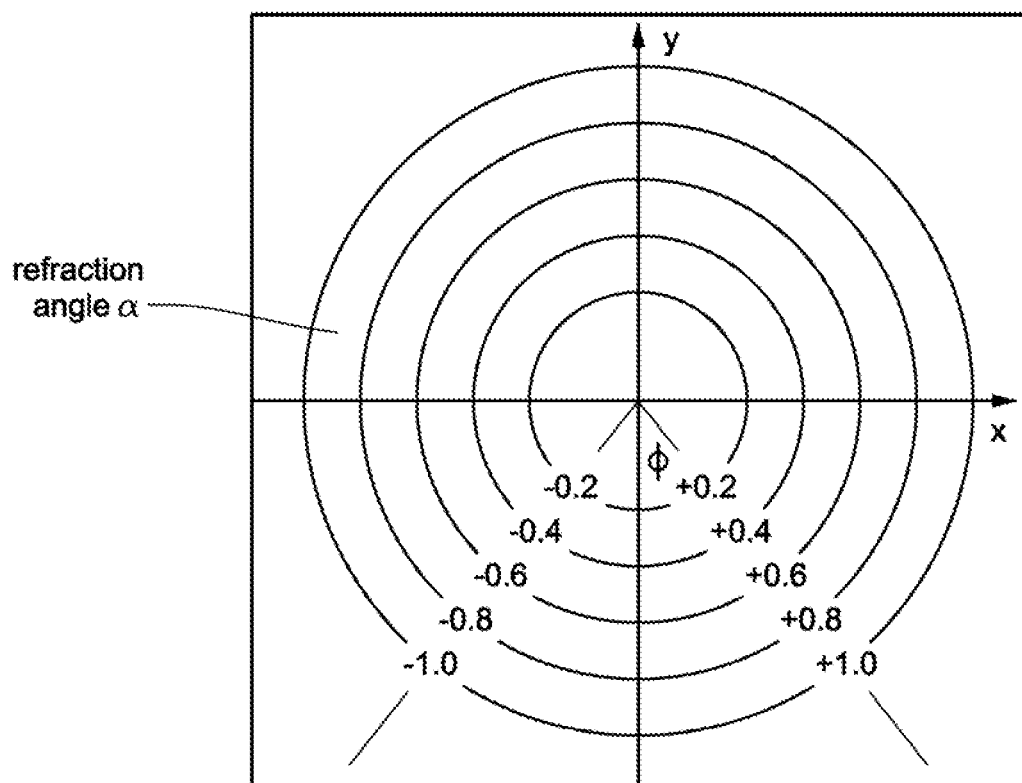
Figure 2B:
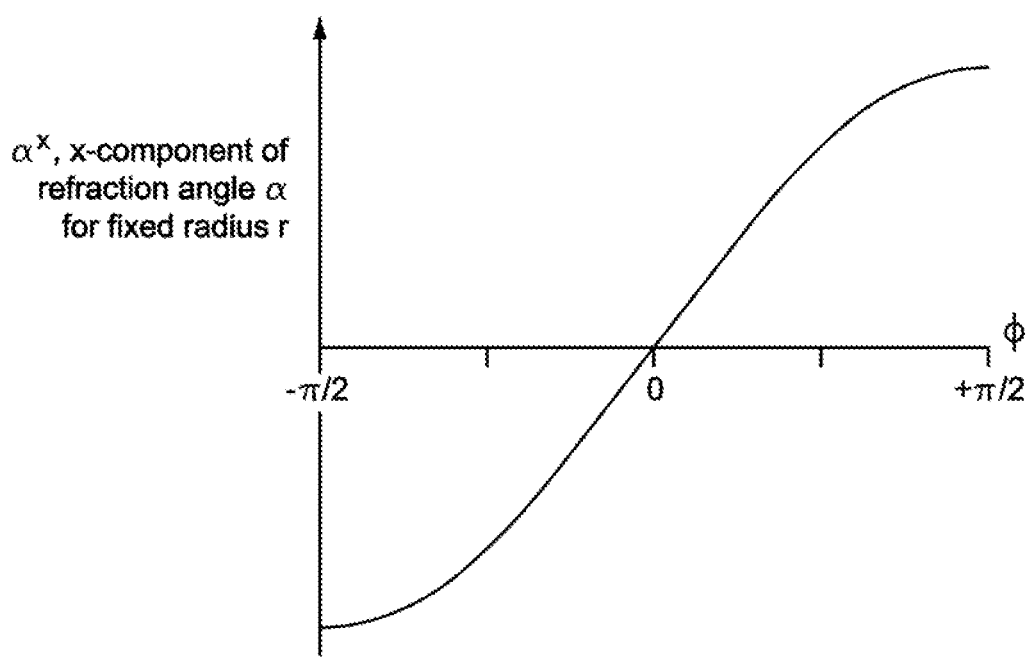

FIG. 2B illustrates the above notion that (lie angled, or curved, surfaces of the monovision lens 10 of FIG. 2A induce a refraction angle a in regions away from the axis of the lens. Since the magnitude of the refraction angle $\alpha$ depends only on the radial distance from the axis, the iso-$\alpha$ contours, i.e. the points where the magnitudes of the refraction angle $\alpha$ are equal, form concentric circles. The shown circles have radii of about r=2.8 mm, r=5.6 mm, r=8.4 mm, r=11.2 mm, and r=14.1 mm. Equation (2) provides that tan $\alpha$, the tangent of the refraction angle $\alpha$ is given as the product of the radius r and the optical power D. Here, the units of D are [1/m], and the units of r are [m]. Since typical values of r are 1-20 millimeters, and values of D are a few diopters [1/m], tan $\alpha$ and thus $\alpha$ takes values in a range of $10^{-3}$-$10^{-1}$. As an example, for r=1 mm, and D=1[1/m], tan $\alpha$=$10^{-3}$. To arrive at more manageable numerical values, one can define a "refraction diopter", or "rD" that is 100*tan $\alpha$. With this definition, a refraction angle for which tan $\alpha$=0.01, has a refraction diopter of 1 rD. Therefore, returning to FIG. 2B, for a 1 D optical power lens, on the shown circles the refraction diopter takes the values 0.28 rD, 0.56 rD, 0.84 rD, 1.12 rD and 1.41 rD. In this document, the refraction angles will be often expressed in terms of refraction diopters. Also, as mentioned, since the refraction angles are small, the angles and their tangents will be used interchangeably.

The lower graph of FIG. 2B illustrates $\alpha^x$, the x-component of the refraction angle $\alpha$, where the x-y coordinate system is based at the center of the lens 10, with its axes being horizontal and vertical in the plane of the lens 10, as shown. There are several ways to define $\alpha^x$ that are analogous to each other. One practical definition is $\alpha^x = \sin \phi^* \alpha$, where $\phi$ is the angle measured from the negative, or lower half of the y-axis, pointing straight down in the plane of FIG. 2B, as shown. Combining with Eq. (2), and using that sin $\phi^* r = x$, the x coordinate of the radial vector of length r, one gets the simple relation:

$$\alpha^x = x^*D. \quad (3)$$

The lower graph in FIG. 2B shows $\alpha^x$ as a function of the angle $\phi$ in general. The upper figure shows the particular values of $\alpha^x$ along the +45 degree and along the -45 degree lines, using sin ($\pm 45$)=$\pm 0.7$. These values are: $\alpha^x$=$\pm 0.2$ rD, $\pm 0.4$ rD, $\pm 0.6$ rD, $\pm 0.8$ rD and $\pm 1.0$ rD, as shown (the units rD suppressed for clarity).

Analogous definitions of $\alpha^x$ include tan $\alpha^x$=sin $\phi^*$tan $\alpha$, which accounts more precisely for the geometry of projections of the refracted light rays 2. However, for the present small angles these two definitions yield very similar numerical values. Finally, the formula can be extended for light rays 2 that are not parallel with the optical axis 3, but, rather, form an angle $\beta$ with the optical axis 3. In general, such extensions would yield an object-angle dependent expression, through a dependence on the angle $\beta$. Notably though, such a $\beta$-dependent formula can be expanded in $\alpha$. Such an expansion would reproduce Eq. (2) in leading order in $\alpha$.

$\alpha^x$ characterizes the x-component of the refraction angle $\alpha$ that in turn determines how much a wearer of the spectacle need to turn her/his gaze to concentrate on these light rays. The greater the $\alpha^x$ in a region of the lens 10, the more the light 2 passing through this region is refracted by the lens 10 and the more a wearer has to turn her/his gaze relative to the lens 10 to align with this refracted light 2.

Figure 2C:
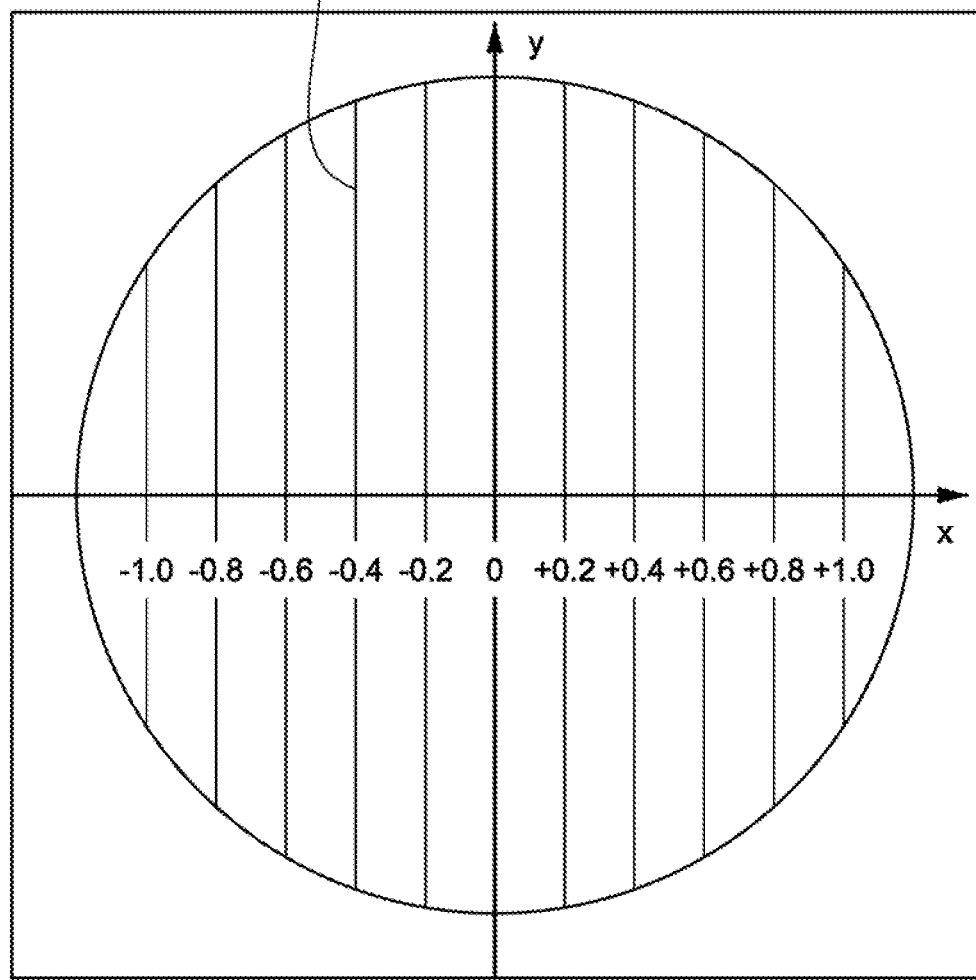

FIG. 2C illustrates the iso-$\alpha^x$ contours for the lens 10 of FIG. 2B, connecting points where $\alpha^x$ assumes the same values. Visibly, for the monovision lens 10 of optical power D, the iso-$\alpha^x$ contours are approximately straight lines parallel to the y-axis, since $\alpha^x$ only depends on the x coordinate of the points of the contour. For greater optical powers and radii, where the linear approximations start to garner corrections, the iso-$\alpha^x$ contours start bulging radially outward close to the x-axis. The shown iso-$\alpha^x$ contour values are for a positive power lens. For a negative power lens, the nasal/left contours acquire positive values and the right temporal contours acquire negative values.

Figure 3B:
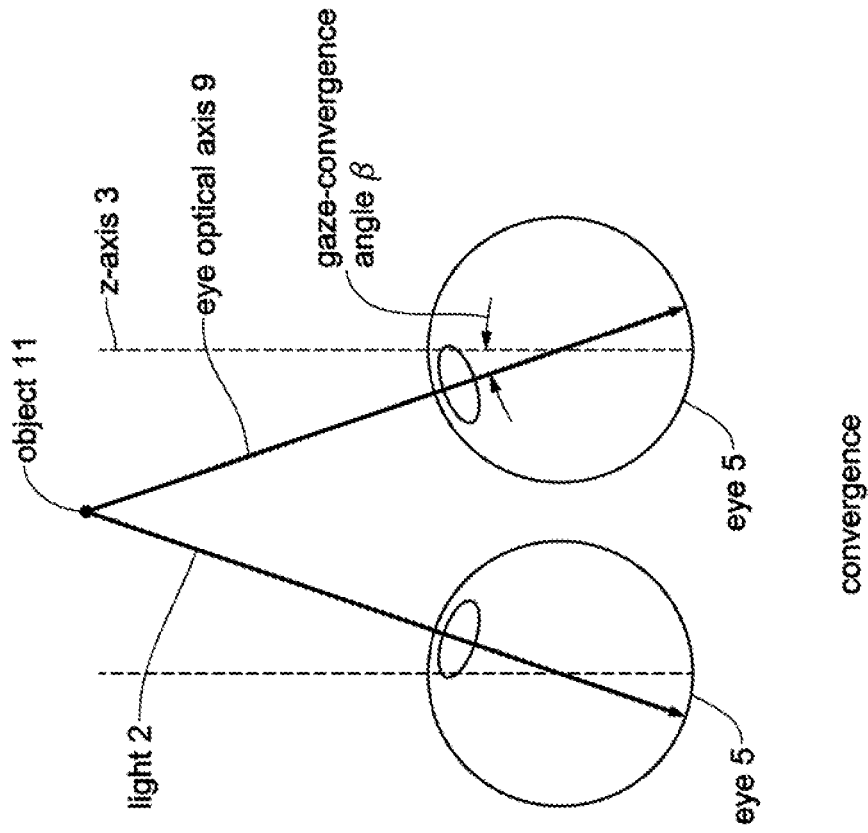
FIGS. 3A-B illustrate a near object inducing a gaze convergence angle.
Figure 3A:
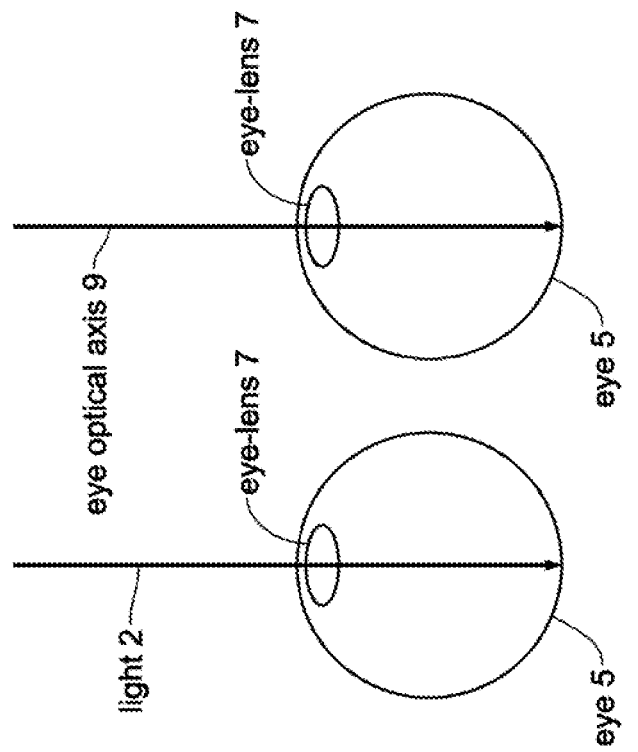

FIG. 3A illustrates that when a person is gazing at a remote object, then the gazing-directions of the left and right eyes are essentially parallel. Therefore, there is no convergence of the gazing-directions and the eye muscles are not strained at all in such cases, the two z-axes 3, pointing to the remote object through the center of the eye 5, coincide with the two eye-optical axes 9. The light rays 2 from the remote object are entering the eyes 5, then propagate through the eye-lenses 7 on their way to hit the retina of the eyes 5. The parallel z-axes 3 will be used as references to characterize the gaze-convergence angles of gazes directed at near objects next.

FIG. 3B illustrates that when a person is gazing at a near object, the gazes of the left and right eyes are tilted, or rotated, towards each other, each gaze making a non-zero gaze-convergence angle $\beta$ with the z-axes 3. Since the gaze-convergence angles $\beta$ characterize the convergence of the gazes of the two eyes towards each other, in what follows the gaze-convergence angle $\beta$ will refer specifically to the x-component of the overall gaze-rotation angle of the eye. This convention of the gaze-convergence angle $\beta$ makes it analogous to the x-component of the refraction angle $\alpha^x$, thus simplifying the description.

As mentioned before, the eyeballs are rotated by muscles attached externally to the eye. In particular, the lateral, x-directional, rotations are controlled by the medial rectus and the lateral rectus muscles, and the vertical rotations are controlled by the superior rectus and the inferior rectus, and superior oblique and inferior oblique muscles. When the medial rectus muscles of the left-eye and the right-eye contract, the gazes of these eyes converge towards each other. A person, training his/her eye on a near object, such as an electronic screen, a digital screen, a screen of a mobile electronic device, work-related papers, or even a book, for extended periods requires the continuous contraction of the medial rectus muscles and the superior oblique muscles, and thus exerts substantial strain on them. This "digital eye-strain" can lead to fatigue, leading to headache, eventually culminating in migraines, caused by the demands of the modern, digital lifestyle.

The digital lifestyle can induce other forms of asthenopia, or eye-strain, and other types of convergence-disorders, including proprioceptive disparity and fixation disparity. Proprioceptive disparity is an imbalance between where the eyes are consciously focused and the perception of where the object is located in space. This disparity depends on different factors. The brain of a patient with a proprioceptive disparity can compensate for this disparity. However, doing so may overstimulate the trigeminal nerve, resulting in patients experiencing headaches, eye fatigue, pain around the eyes, blurred vision, neck pain, dry eyes, and other general symptoms of asthenopia.

A class of symptoms especially worthy of mentioning is Computer Vision Syndrome (CVS), which is estimated to affect more than 100 million Americans. Computer Vision Syndrome is the physical eye discomfort felt after spending a prolonged time viewing near-distance computer devices. CVS can include, or induce, a variety of asthenopia symptoms, and thus can have negative effects on health, well-being, mood and productivity.

Another large class of symptoms is known by the name of Chronic Daily Headaches (CDH). CDH symptoms are estimated to affect more than 30 million Americans. These patients suffer from an over-stimulation of the trigeminal nerve that manifests itself in chronic daily headaches. Various factors and triggers are believed to contribute to debilitating chronic daily headaches. In the absence of a consensus on its causation, patients suffering from CDH are limited to treatment options that merely seek to dull the symptoms. Applicants noted, however, that a substantial fraction of chronic daily headache patients exhibit objective signs of a misalignment between how the central visual system, the peripheral visual system, and the neurological system interact. Therefore, Applicants propose to alleviate the root causes of asthenopia, CVS, and CDH by developing spectacle lenses that modify the gaze convergence and address the observed misalignment.

Figure 4A:
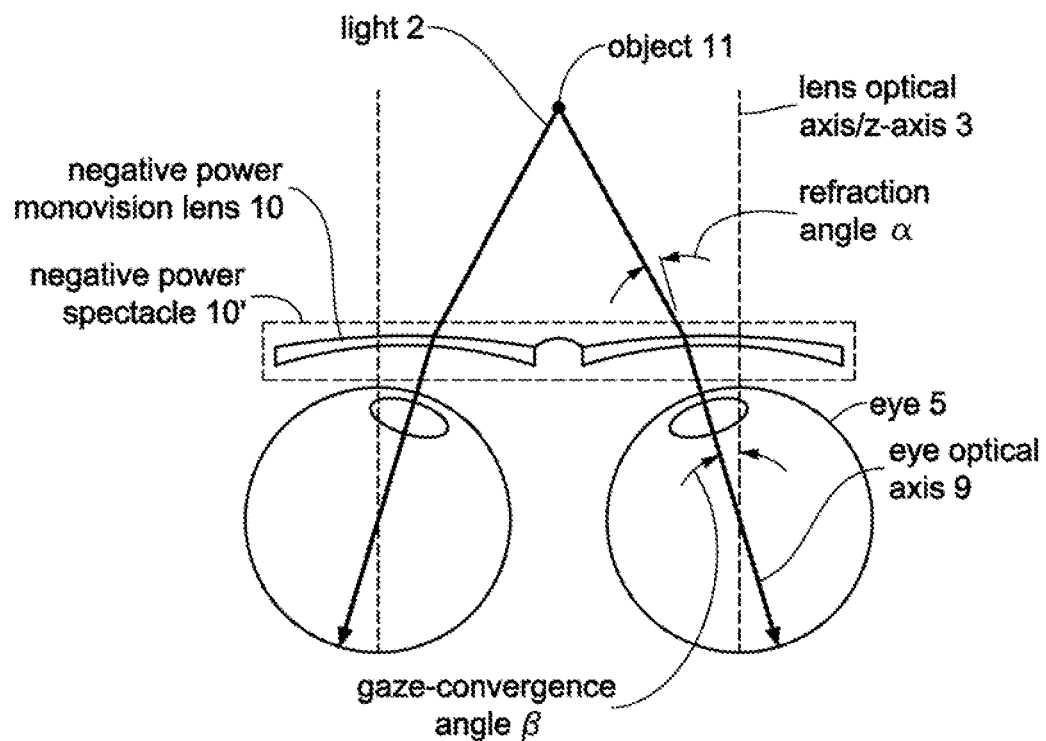
FIGS. 4A-B illustrate an effect of a convergence-reducing lens on the gaze convergence angle.

FIG. 4A illustrates that negative power (monovision) spectacles 10' can allow the eyes to reduce the gaze convergence angle β to a limited degree, compared to the glass free case of FIG. 3B, because $\alpha^x$, the x component of the refraction angle α, is positive in the nasal region, as explained in connection to FIG. 2C. Thereby, these negative power monovision spectacles 10' can somewhat ease the symptoms of eye-strain, astenophia, Computer Vision Syndrome, CDH, and proprioceptive disparity, caused by digital devices. However, often this relief is not sufficient and the eye-strain and astenophia persist even for wearers of negative power monovision spectacles.

Figure 4B:
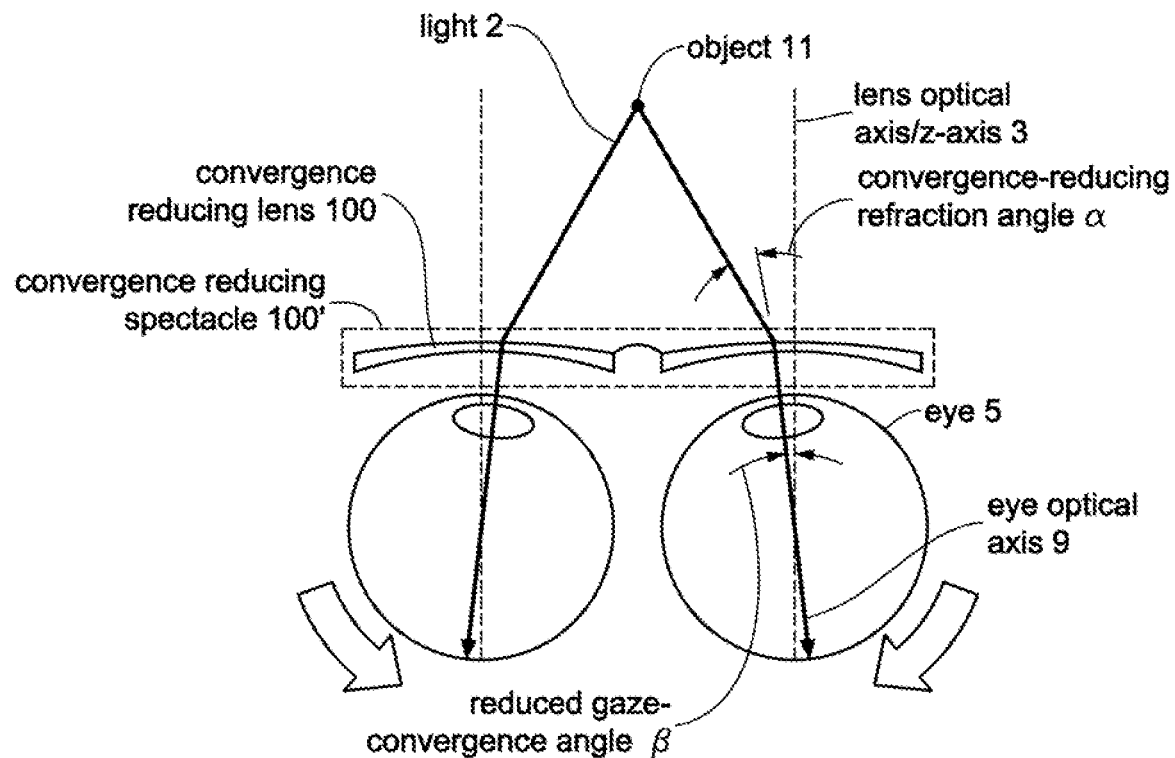

FIG. 4B illustrates embodiments of a convergence-reducing lens 100 in convergence-reducing spectacle 100' that can further reduce, and often eliminate the symptoms caused by eye-strain, astenophia, Computer Vision Syndrome and proprioceptive disparity for negative power lenses. The convergence-reducing spectacles 100' with convergence-reducing lenses 100 have suitably modified refraction-angles α that reduce the gaze-convergence angles β when their wearers look at a nearby object, such as at a digital device. Reduced gaze-convergence angles β require a lesser rotation of the eyes in the nasal direction, and therefore relieve the continuous contraction and strain of the medial rectus and the superior oblique muscles of the eyes. This reduced muscle strain reduces and often eliminates digital migraines.

Figure 5A:
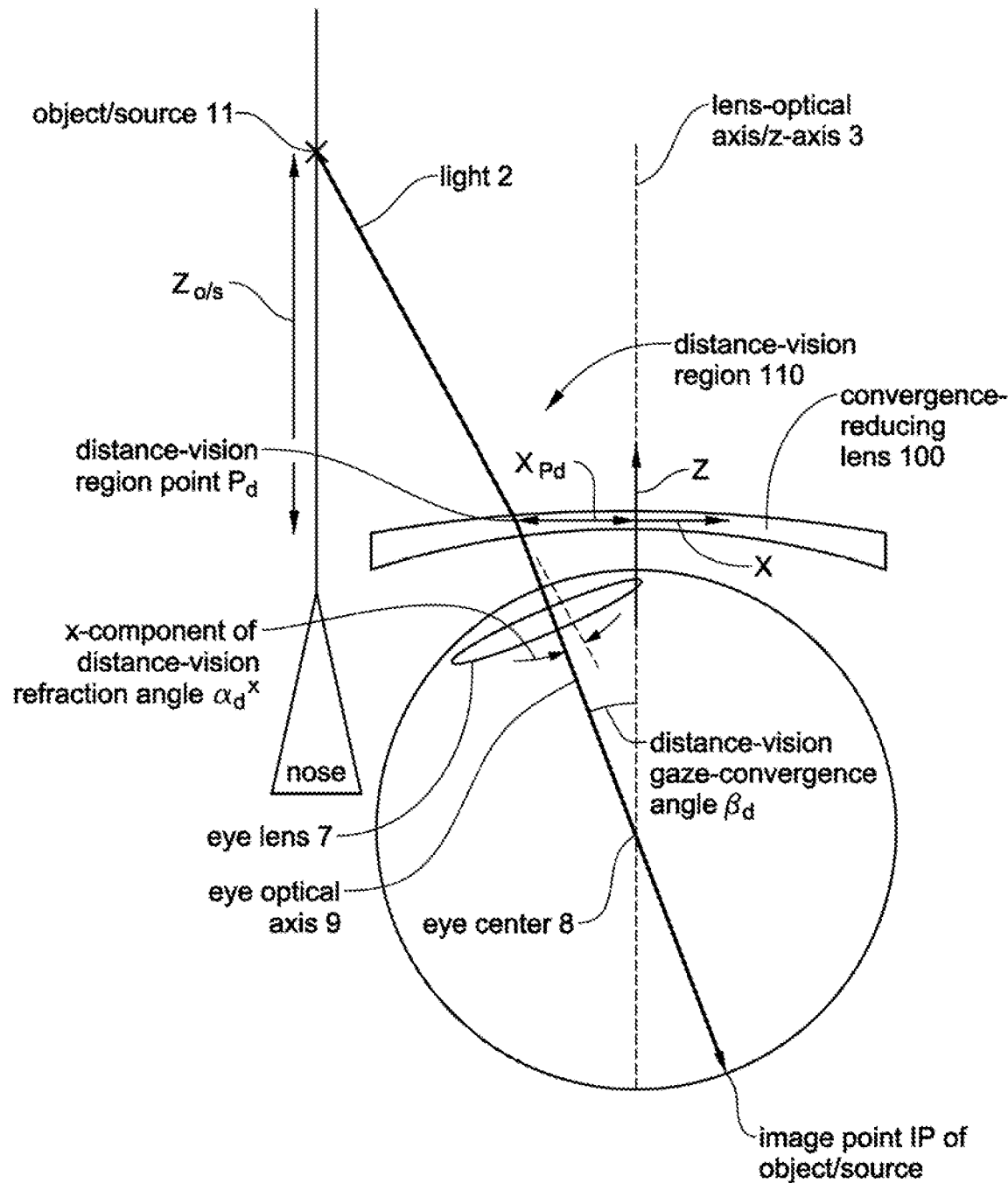
FIGS. 5A-D illustrate an effect of convergence-reducing lenses on light propagation.
Figure 5B:
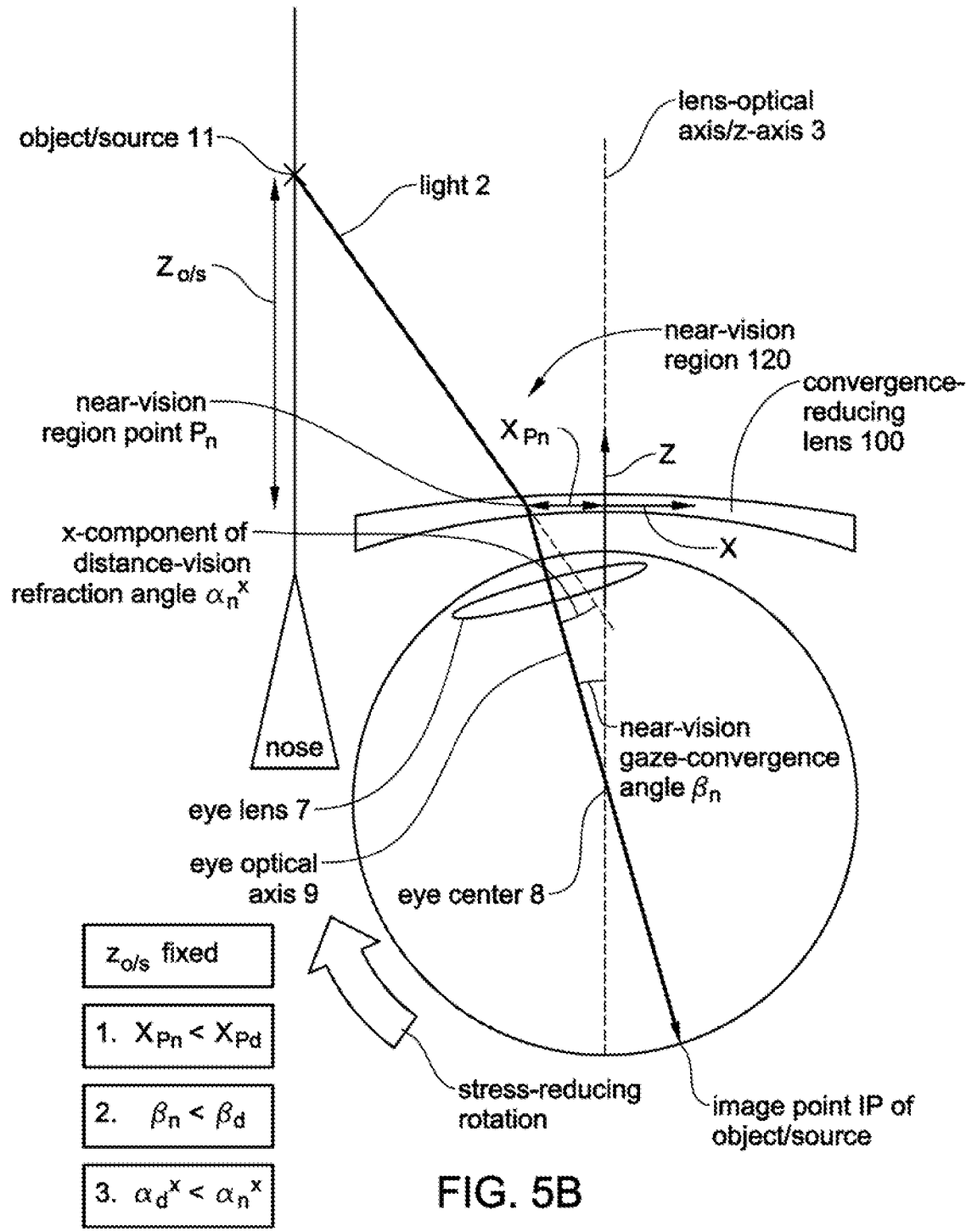

FIGS. 5A-B illustrate in detail an embodiment of an eye-strain-reducing lens 100, or convergence-reducing lens 100, that relieves eye-strain and related digital eye discomforts. Throughout this application, the terms eye-strain-reducing lens 100 and convergence-reducing lens 100 will be used and treated interchangeably. For clarity, only one of the convergence-reducing lenses 100 of the convergence-reducing spectacle 100' is shown. The below description applies for the other lens of the convergence-reducing spectacle 100' with the appropriate modifications, such as mirror-reflection across the nose. A nose of the spectacle-wearer is shown for reference. Embodiments of the convergence-reducing lens 100 can define air x-y-z coordinate system as follows. A central normal of the convergence-reducing lens 100 can define a z-axis 3, and a central region of the convergence-reducing lens 100 can define a tangential, centered x-y plane. The center of the coordinate system can be at the center of the convergence-reducing lens 100. The convention is adopted that the x-axis is "horizontal" with respect to the spectacle 100', and thus goes through the centers of both the left and the right convergence-reducing lenses 100. Accordingly, the y-axis is vertical. While lenses in spectacles are not always circular, and thereby the definition of their center may not appear sharply defined, the standard product of a lens manufacturing process is a circular disc, often called a puck, from which the lens is subsequently cut out. The center of these circular discs, or pucks, is well-defined. Natural extensions or adaptations of the concept of the center can be defined for specific lenses, thereby anchoring the definition of the x-y-z coordinate system. Sometimes, for brevity, the x-y-z coordinate system will simply be referred to as the coordinate system.

With this x-y-z coordinate system, and with reference to FIG. 5A, the convergence-reducing lens 100 can include a distance-vision region 110, having a negative distance-vision optical power, configured to refract a light ray 2, directed by a source (or object, see below) 11 at a distance-vision region point $P_d$ at a distance-vision x-distance $x_{Pd}$ from a center of the (x-y-z) coordinate system, to propagate to an eye-center representative location 8. In some embodiments, the eye-center representative location 8 can be an eye center 8 itself. In other embodiments, it can be a sensor, positioned at the location 8, or a screen, positioned across location 8, wherein the eye-center representative location 8 lies on the z-axis 3, at a z-distance in the range of 15-25 mm from the center of the lens's coordinate system in a direction that is opposite to the direction of the source. These latter eye-center representative locations 8 can be more suitable and accessible for measurements and characterizations. For example, a full-size eye model can be employed in place of the eye 5, including a lens that is positioned and acts to represent the eye lens 7 and the cornea of the eye. This eye model can be rotatable around a y-directional axis, positioned at the eye-center representative location 8.

FIG. 5B illustrates that the convergence-reducing lens 100 can further include a near-vision region 120, having a near-vision optical power dial matches the negative distance-vision optical power within 0.5 diopters D, configured to refract a light ray 2, directed by the source 11 at a near-vision region point $P_n$ at a near-vision x-distance $x_{P_n}$ from the center of the coordinate system, to propagate to an x-z location of the eye-center representative location 8, at the corresponding y height.

The x-z locations of the eye-center representative locations 8 in FIG. 5A and FIG. 5B are (at least approximately) the same, while the corresponding, y heights are different, because they heights of the distance-vision region 110 and the near-vision region 120 are different. Since FIGS. 5A-D show the embodiments in an x-z cross section, only the coinciding x-z locations of the eye-center representative locations 8 are illustrated.

Since the optical power of the near-vision region 120 can be very close, and in some embodiments, equal to the optical power of the distance-vision region 110, embodiments of the convergence-reducing lens 100 can be called a monovision lens, or a single-vision lens. This aspect can distinguish these lenses from other, traditional bi-focal lenses where the near-vision and distance-vision optical powers are different.

For clarity, in this document the term "optical power" refers to the optical power specifically related to the focal length f of the lens, and is measured in diopters D that are inversely related to the focal length: D=1/f. Also, FIG. 5A can be a cross section of the convergence-reducing lens 100 at a high, positive y coordinate, whereas FIG. 5B may illustrate a cross section of the same convergence-reducing lens 100 at a lower, negative y coordinate. In this document rays are sometimes described as hitting the convergence-reducing lens 100 at the same x-distance in the distance-vision region 110 and the near-vision region 120. Naturally, the x-distance is hit at a higher/positive y value for the distance-vision region 110, while the same x-distance is hit at a lower/negative y value for the near-vision region 120.

In the embodiments of FIGS. 5A-B, the near-vision x-distance $x_{P_n}$ is smaller than the distance-vision x-distance $x_{P_d}$, as shown. Visibly, since in these embodiments the near-vision x-distance $x_{P_n}$ is smaller than the distance-vision x-distance $x_{P_d}$, the wearer of this convergence-reducing lens 100 can rotate an eye-optical axis 9 of his/her eye closer toward the z-axis 3 when looking at the source 11 through the near-vision region 120 relative to the case when the wearer is looking at the same source 11 through the distance-vision region 110 (at the corresponding y height), thereby reducing the gaze convergence angle β, as described further next. As indicated in FIG. 5B, the reduced gaze-convergence angle β translates into a stress-reducing rotation of the eye 5. Accordingly, the convergence-reducing lens 100 can also be called an eye-strain reducing lens 100. For this reason, the convergence-reducing spectacles 100' deliver the much-needed medical benefit of reducing eye-strain, digital migraines, CVS, CDH, proprioceptive disparity, fixation disparity, asthenopia, and convergence-disorders in general.

Related eye-strain reducing lenses with non-negative optical power in the distance-vision region have been described in the co-pending, and commonly owned patent applications U.S. Ser. No. 15/289,157: "Eye-strain reducing lens"; U.S. Ser. No. 15/289,163: "Low convergence spectacles"; and U.S. Ser. No. 15/289.194: "Lens with off-axis curvature center", all three to J. P. Krall, A. Plumley and G. T. Zimanyi. A point of difference between the presently described embodiments and those described in these three applications is that non-negative power lenses exacerbate eye-strain in the near vision region, while the here described negative power lenses may reduce eye-strain to a limited degree. In spite of this reduction, however, Applicants found, while working with patients, that further relief is often needed. This further relief of eye-strain is delivered by the here described eye-strain reducing spectacles 100'.

Bifocal glasses have a near-vision region separate from the usual distance-vision region. Such glasses can be bestowed with the additional medical benefit of eye-strain reduction by making the convergence, or refractive, properties of these two vision regions also different.

A distinguishing feature of the here-described single-vision, or monovision convergence-reducing lenses 100 is that they have a near-vision region 120 with a refractive power different from the refractive power of the distance-vision region 110, in spite of the two regions having matching optical powers. This is to be contrasted with the just-mentioned bifocal lenses, where both the refractive and the optical powers of the two vision regions are different. This is a qualitative, crucial distinction for at least the following reasons.

(1) Bifocal spectacles already have two vision regions with a differing optical property, the optical power. Therefore, it may occur to a lens designer to make a further optical property also different, such as the refractive power, to reduce convergence. However, in monovision lenses it is far from obvious for a designer to think of, and to create a near-vision region for the sole purpose of delivering a different refractive power in a lens where the optical power of the near-vision region is the same as that of the distance-vision region of the lens.

(2) The global market for spectacle lenses exceeded 1 billion units sold worldwide in 2015, and more than 320 million in the US alone. It is also estimated that 75% of the US population, or about 240 million people wear some sort of vision correcting spectacles. By far the broadest market segment of spectacles sold in the US today, about 90% of the total market, have monovision lenses, and only about 10%, or 20-25 million people wear bifocals. The mostly younger and early-middle age wearers of monovision lenses simply do not need bifocal lenses. Some industry surveys estimate the number of people who suffer, or report, Computer Vision Syndrome to exceed 100 million people. Earlier we have cited other sources that estimated the potential patients at 30 million, based on different symptoms and definitions. Therefore, introducing convergence-reducing near-vision regions into monovision spectacles will extend the reach of the convergence-reduction technology from the narrow, 10-20 million unit/year market segment of bifocals to the 100 million-plus unit/year market segment of monovision glasses. Therefore, the here-described monovision glasses will dramatically broaden the group of people to whom the medical benefit of convergence-reduction can be delivered.

(3) Convergence-reducing monovision glasses with zero or near zero optical powers will qualitatively broaden the market penetration to yet another wide class. These glasses will deliver the medical benefit of convergence reduction to people who do not need optical power correction at all, and therefore did not think of wearing glasses up to now. For this reason, zero, or near-zero, optical power monovision spectacles will dramatically extend the segment of the population to whom the medical benefit of convergence-reduction is delivered even further.

Finally, it is mentioned that in present-day optometric practice, most doctors have a different theory of the cause of eye-strain, and therefore oiler very different treatments and procedures to alleviate eye-strain, or asthenopa. Optometrists often prescribe switching to glasses with blue light filters, or suggest using humidifiers. Therefore, prescribing glasses with the here-described convergence-reduction technology rests on a very different medical insight regarding what causes eye-strain, and an inventive treatment to alleviate it that is genuinely different from what is prescribed by the majority of today's optometric practitioners.

In this patent document, the term monovision lens, or single-vision lens, is used in a broader sense. Naturally, its scope includes lenses whose front and rear surfaces each have a single radius of curvature. Beyond that, the term can also include lenses whose shape has components beyond the single radius of curvature. An example is an aspheric component, where components can be defined in different manners, including Zernike decompositions. Typically, aspheric components are introduced to compensate for an optical distortion of the lens. Several factors can cause the optical distortion: the finite thickness of the lens, aspects of the index of refraction, and the far-from axis behavior of the light rays, among others. An aspheric component can also be introduced not for compensating a distortion, but to achieve an optical benefit. The term monovision can also include lens shapes that combine a single optical power with a power-neutral benefit. Typical examples include a cylinder, astigmatism, or coma, introduced into an otherwise single-vision lens, to compensate a corresponding vision distortion. The scope of single-vision lenses does not include bifocal lenses. To summarize, in the described convergence-reducing lenses 100 at least one of the distance-vision region 110, or the near-vision region 120, can include an aspheric component, a power-neutral component, a cylinder, a coma, or an astigmatic component.

Here and later in the text, the light propagation is described as originated by the source 11, or interchangeably from an object 11. The source 11 can be a laser pointer or another, directed light source that actively generates a light ray 2. In some other embodiments, the object 11 may not be an active light source, rather, an object or mirror that reflects an incident light as the described light 2 toward the convergence-reducing lens 100, wherein the incident light originated somewhere else. From the viewpoint of the light propagation, these two cases can be interchangeable. The object 11, or source 11, can be at a z-distance $z_{o/s}$, from the x-y plane of the convergence-reducing lens 100.

In embodiments of the convergence-reducing lens 100, the distance-vision region 110 can be configured to refract the light ray 2, directed by the source 11, or object, 11 at the distance-vision region point $P_d$ at the distance-vision x-distance $x_{Pd}$, to intersect a y-z plane of the coordinate system with a distance-vision gaze-convergence angle $\beta_d$; whereas the near-vision region 120 can be configured to refract the light ray 2, directed by the source 11 at the near-vision region point $P_n$ at the near-vision x-distance $x_{Pn}$, to intersect the y-z plane with a near-vision gaze-convergence angle $\beta_n$. In these embodiments of the convergence-reducing lens 100 the near-vision gaze-convergence angle $\beta_n$ can be smaller than the distance-vision gaze-convergence angle $\beta_d$. Typically, the intersection of the refracted light 2 with the y-z plane with the gaze convergence angle $\beta_{n/d}$ occurs at the eye-center representative location 8.

Here, the gaze-convergence angles $\beta_d$ and $\beta_n$ characterize the convergence of the eye's gaze, and thus they can correspond to the x-component of the overall, 3d dimensional rotation angle of the eyes, in analogy to $\alpha^x$, the x-component of the overall refraction angle $\alpha$.

The reduction of the gaze-convergence angle $\beta_n$ in the near-vision region 120 relative to the gaze-convergence angle $\beta_d$ in the distance-vision region 110 is a second expression that when the wearer looks at an object 11 through the near-vision region 120 of the convergence-reducing lens 100, she/he does not need to rotate her/his eyes away from the z-axis 3 as much as in the case of looking at the same object through the distance-vision region 110 of the lens 100. Therefore, embodiments of the convergence-reducing lens 100 indeed reduce the convergence angle β of the gaze of its wearer, when looking at objects through the near-vision region 120, compared to looking at the same object through the distance-vision region 110 at the corresponding y height, or even through an analogous regular negative power lens 10.

In some embodiments of the convergence-reducing lens 100, the distance-vision region 110 can be configured to refract the light ray 2, directed by or from the source 11 at the distance-vision region point $P_d$ at the distance-vision x-distance $x_{Pd}$, by a distance-vision refraction angle $\alpha_d$, whereas the near-vision region 120 can be configured to refract the light ray 2, directed by or from the source 11 at the near-vision region point $P_n$ at the near-vision x-distance $x_{Pn}$, by a near-vision refraction angle $\alpha_n$. In such embodiments of the convergence-reducing lens 100, an x-component $\alpha_n^x$ of the near-vision refraction angle $\alpha_n$ can be greater than an x-component $\alpha_d^x$ of the distance-vision refraction angle $\alpha_d$. This is a third expression that the lens 100 is reducing the gaze-convergence β, when its wearer is looking at the object 11 through the near-vision region 120, relative to looking at the same object 11 through the distance-vision region 110 at the appropriate y height.

The above three related expressions of the gaze-convergence reducing aspects of the convergence-reducing lens 100 are stated as boxed inequalities in FIG. 5B. These inequalities are repeated here:

$$x_{Pn} < x_{Pd}, \tag{4}$$

$$\beta_n < \beta_d, \text{ and} \tag{5}$$

$$\alpha_d^x < \alpha_n^x, \tag{6}$$

all for the same fixed object, or source, distance $z_{o/s}$. Embodiments of the convergence-reducing lens 100 satisfy at least one of these three inequalities (4)-(6).

The above descriptions of embodiments of the convergence-reducing lens 100 also articulate auditing protocols to determine, whether a lens is a convergence-reducing lens.

(1) It is possible to measure the described distance $x_{Pd}$ and angles $\alpha_d^x$ and $\beta_d$ directly, when a wearer of the lens is looking at an object through a distance-vision region of a lens, followed by measuring the corresponding distance $x_{Pn}$ and angles $\alpha_n^x$ and $\beta_n$ as the wearer looks through a corresponding near-vision region of the lens, and then to compare the measured angles and distances to verify whether they satisfy at least one of the described three inequalities (4)-(6). For lenses, where the changes of the angles are small, an eye-tracking, or eye-imaging, system can be used to determine the changes in the wearer's gaze-angle to detect the small changes and differences.

(2) Instead of measuring angles and directions of a wearer's gaze, an eye model with realistic parameters can be used as well. The eye model can include a disk of a diameter of about 20-25 mm, such as 24 mm, rotatable around a y-axis, positioned at an eye-center representative location 8. The front of the eye model can be positioned 10-15 mm behind the lens 100, the eye-center representative location 8 about 20-30 mm behind the lens 100. The eye model can include an appropriate model lens, with a total optical power approximately equal to that of the cornea, about 40-45 D, plus that of the eye lens 7, about 15-25 D. A directed light source, such as a laser pointer, or equivalents, can be deployed in place of the source 11. Its light can be pointed at the distance-vision region, and then separately at the near-vision region of an audited lens. The eye model can be appropriately rotated, so that after refraction by the model lens, the light goes through the eye-center representative location 8 of the eye model in both cases. The above-described angles and distances of inequalities (4)-(6) can then be measured to determine whether at least one of the three above inequalities applies to the audited lens.

(3) Finally, measurements without involving a wearer's eye, or even an eye-model, can also be sufficient to determine whether an audited lens is an embodiment of the convergence-reducing lens 100. A lens can be audited on a fixed optical table by pointing a laser pointer from a position of the source 11 at the lens such that its light after refraction by the lens propagates through a candidate point for an eye-center representative location 8, about 20-30 mm behind the center of the lens 100 along the z-axis 3. The light's propagation can be tracked, e.g., by implementing a screen in the y-z plane of the lens 100 on the side opposite to the source 11. The light of the laser pointer 11 can be directed at a distance-vision region of the audited lens, then subsequently through a near-vision region of time audited lens, ensuring that the refracted light in both cases intersects the y-z plane at the same z-distance from a center of the coordinate system that is representative of an eye center 8. As described above, such representative locations can be 20-30 mm behind the center of the lens, on the z-axis 3. Once the angles and distances, discussed before, are measured for the light directed at the distance-vision and then the near-vision regions, a lens is an embodiment of the convergence-reducing lens 100 if at least one of the three inequalities in FIG. 5B, and discussed above in inequalities (4)-(6), holds for the measured angles and distances.

Adjusting the "corresponding y height" of the eye-center representative location 8 in FIGS. 5A-B, or the image 11r in FIGS. 5C-D, (collectively: the images) as the light rays are redirected by the source 11, or the source 8r, from the distance-vision region 110 to the near-vision region 120 in the above listed audit protocols (1)-(3) can be performed in various ways as follows. (1) The wearer can change the direction of his/her gaze from the distance-vision region 110 to the near-vision region 120 of the fixed convergence-reducing lens 100; (2) the optical axis of the eye model can be liked; or (3) the direction of the laser pointer can be changed. These protocols keep the y heights of the convergence-reducing lens 100, as well as that of the object/source 11, or source 8r (collectively: the sources) fixed. This class of protocols can be called "image-adjusting protocols" to audit, whether any one of the inequalities (4)-(6) is satisfied by the audited lens.

For each of these cases, however, analogous alternative "lens-adjusting protocols" can be defined and performed, where the y height of the convergence-reducing lens 100 is adjusted instead of that of the images, or the sources by lifting or lowering the lens itself, while keeping the y heights of the source and the image fixed. For these protocols, the "corresponding y height" of the eye-center representative location 8 of the near-vision region 120 is the same as for the distance-vision region 110. These lens-adjusting protocols can also be used to audit whether any one of the inequalities (4)-(6) is satisfied by the audited lens, and thus capture the embodiments of the convergence-reducing lens 100 in an equivalent manner.

A third class of alternative, "source-adjusting protocols" keep the y heights of both the images and the convergence-reducing lens 100 fixed, and adjust the y heights of the sources instead. As before, these source-adjusting protocols can be used to audit whether any one of the inequalities (4)-(6) is satisfied by the audited lens, and thus capture the embodiments of the convergence-reducing lens 100 in an equivalent manner.

In sum, in embodiments of the convergence-reducing lens 100, or eye-strain-reducing lens 100 the near-vision x-distance $x_{Pn}$ can be smaller than the distance-vision x-distance $x_{Pd}$ as determined by at least one of an image-adjusting protocol, a lens-adjusting protocol, or a source-adjusting protocol. Yet other auditing protocols will be described later, in relation to FIGS. 5C-D and FIGS. 7A-D.

The convergence-reducing lens 100 can include a progression region 140 where at least one of $x_{Pp}$, the x-distance of a progression region point Pp; or a progression region gaze-convergence angle $\beta_P$, or an x-component of the progression-region refraction angle, $\alpha_P^x$, transitions between its near-vision region value and its distance-vision region value. Formally, at least one of the following inequalities hold in the progression region 140: $x_{Pn} < x_{Pp} < x_{Pd}$; or $\beta_n < \beta_p < \beta_d$; or $\alpha_d^x < \alpha_p^x < \alpha_n^x$. An example of such a progression region 140 will be described in some detail in FIGS. 7A-B.

FIGS. 5A-B illustrate that the object/source 11 can be a near object, located at a source x-distance from the z-axis 3 of the coordinate system that is greater than a radius of the convergence-reducing lens 100, and at a source z-distance that is between 10 cm and 100 cm. Such an off-center, off-axis source 11 can be a good representation of a near object, aligned with a nose of the spectacle wearer, as shown.

Figure 5C:
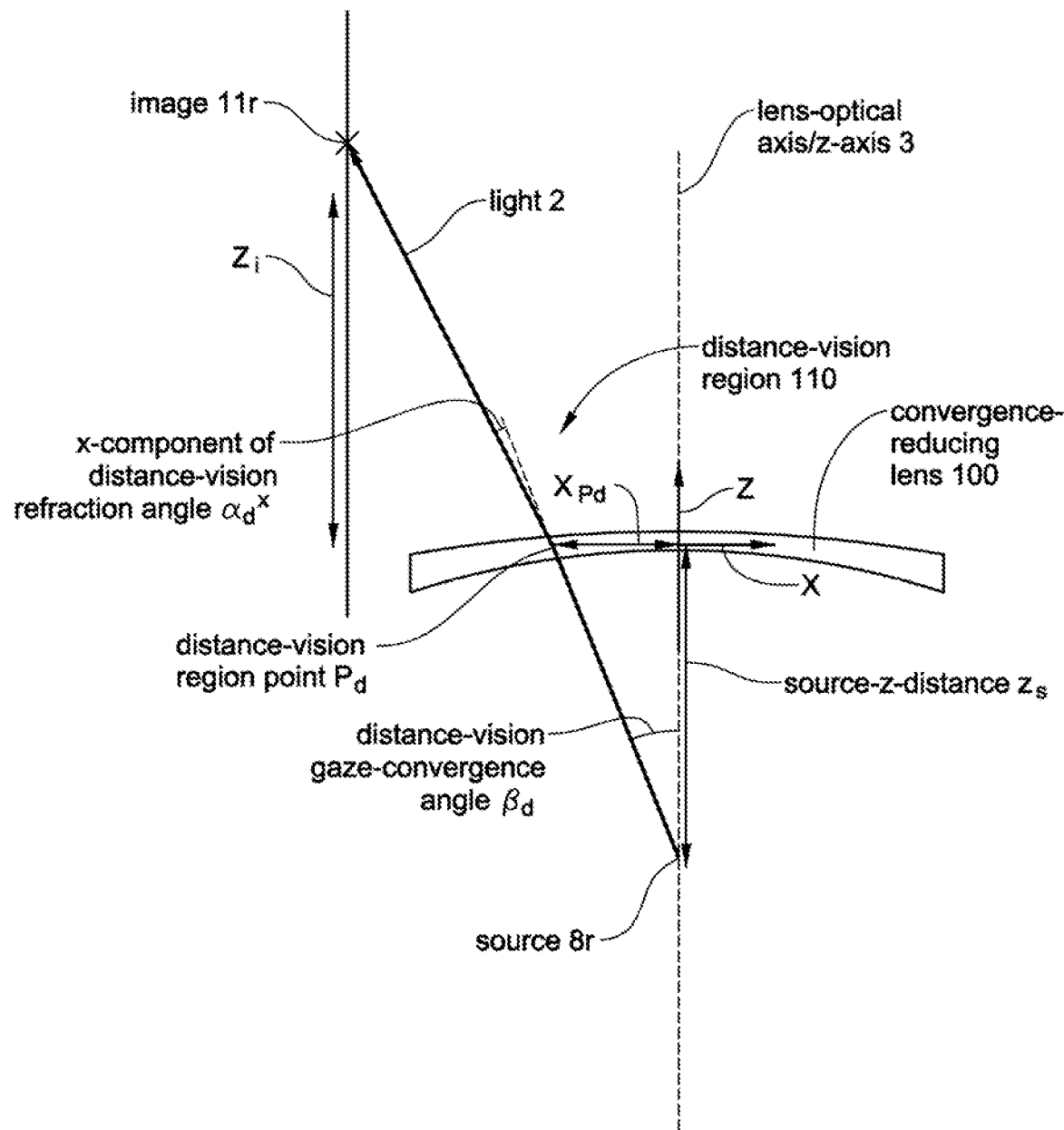
Figure 5D:
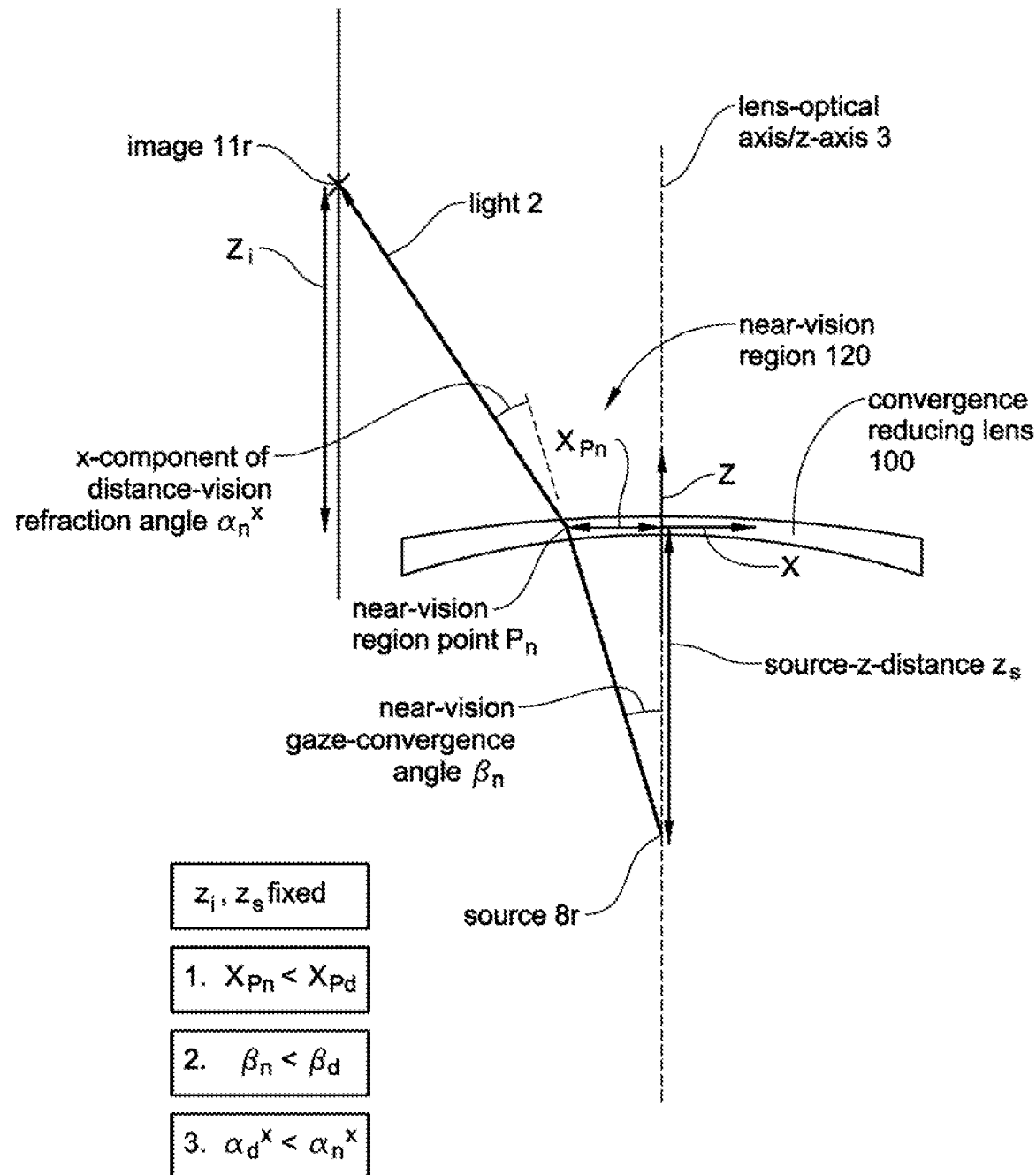

FIGS. 5C-D illustrate further aspects of the convergence-reducing lenses 100. The characterization of the embodiments of FIGS. 5C-D is largely analogous to that of FIGS. 5A-B. These characterizations are motivated by the reversibility of the paths of propagating light rays 2. To indicate that the source and image in FIGS. 5C-D are related to the source and image in FIG. 5A-B by path-reversal, corresponding labels are use with an "r" added.

With these introductory considerations, some embodiments of a convergence-reducing lens 100 can have a distance-vision region 110, having a negative distance vision optical power, that is configured to refract a light ray 2 directed by a source 8r at a distance-vision region point $P_d$, at a distance-vision x-distance $x_{Pd}$ from the center of the coordinate system, to propagate to an image point 11r. The image point 11r, in some sense the reverse-pair of the object/source 11 of the embodiments in FIGS. 5A-B, can be located at a z-distance $z_I$ from the x-y plane of the lens 100. The source 8r, in some sense the reverse-pair of the eye-center representative location 8 of the embodiments in FIGS. 5A-B can be located on the z-axis 3 at a source-z-distance $z_s$ from a center of the coordinate system.

This embodiment of the convergence-reducing lens 100 can further include a near-vision region 120, having a near-vision optical power that matches the distance-vision optical power within 0.5 D, configured to refract a light ray 2 directed by the source 8r, located at the same source-z-distance $z_s$ from a center of the coordinate system, at a near-vision region point $P_n$ at a near-vision x-distance $x_{Pn}$ from the center of the coordinate system to propagate to an x-z location of the image point 11r, at a corresponding y height. In these embodiments, the near-vision x-distance $x_{Pn}$ can be smaller than the distance-vision x-distance $x_{Pd}$, in analogy to inequality (4) of the embodiments of FIGS. 5A-B.

The x-z locations of the image points 11r in FIG. 5C and in FIG. 5D are (at least approximately) the same, while the corresponding y heights are different, because the y heights of the distance-vision region 110 and the near-vision region 120 are different. Since FIGS. 5A-D show the embodiments in an x-z cross section, only the coinciding x-z locations of the image points 11r are illustrated.

As discussed earlier, in some embodiments, analogous protocols can be defined where a y height of the convergence-reducing lens 100 is adjusted instead the y height of the image point 11r, so that the y directional angle of the light ray 2 does not need to be adjusted when switching from the distance-vision region 110 to the near-vision region 120. Finally, in yet other alternative embodiments, a y height of the source 8r can be adjusted when redirecting the light rays 2 from the distance-vision region 110 to the near-vision region 120, while preserving the y heights of the convergence-reducing lens 100 and the image point 11r. As before, image-adjusting, lens-adjusting, and source-adjusting protocols can define closely related embodiments of the convergence-reducing lens 100.

In some embodiments, the distance-vision region 110 can be configured so that the source 8r can direct the light ray 2 to propagate to the image point 11r via a refraction at the distance-vision region point $P_d$ by directing the light ray 2 with a distance-vision gaze-convergence angle $\beta_d$ relative to a y-z plane of the coordinate system; and the near-vision region 120 can be configured so that the source 8r can direct the light ray 2 to propagate to the x-z location of the image point 11r via a refraction at the near-vision region point $P_n$ by directing the light ray 2 with a near-vision gaze-convergence angle $\beta_n$ relative to the y-z plane of the coordinate system. In these embodiments, the near-vision gaze-convergence angle $\beta_n$ can be smaller than the distance-vision gaze-convergence angle $\beta_d$, in analogy to inequality (5) above.

In some embodiments, the distance-vision region 110 can be configured to refract the light ray 2, directed by the source 8r at the distance-vision region point $P_d$ to propagate to the image point 11r, by a distance-vision refraction angle $\alpha_d$. The near-vision region 120 can be configured to refract the light ray 2, directed by the source 8r at the near-vision region point $P_n$ to propagate to the x-z location of the image point 11r, by a near-vision refraction angle $\alpha_n$. In embodiments, $\alpha_n^x$, the x-component of the near-vision refraction angle $\alpha_n$ can be greater than $\alpha_d^x$, the x-component of the distance-vision refraction angle, $\alpha_d$, in analogy to inequality (6) above.

As before, the convergence-reducing lens 100 can include a progression region 140 where at least one of the $x_{Pp}$, the x-distance of a progression region point Pp, a progression region gaze-convergence angle $\beta_P$, and an x-component of the progression-region refraction angle, $\alpha_p^x$, transitions between its near-vision region value and its distance-vision region value.

Figure 7A:
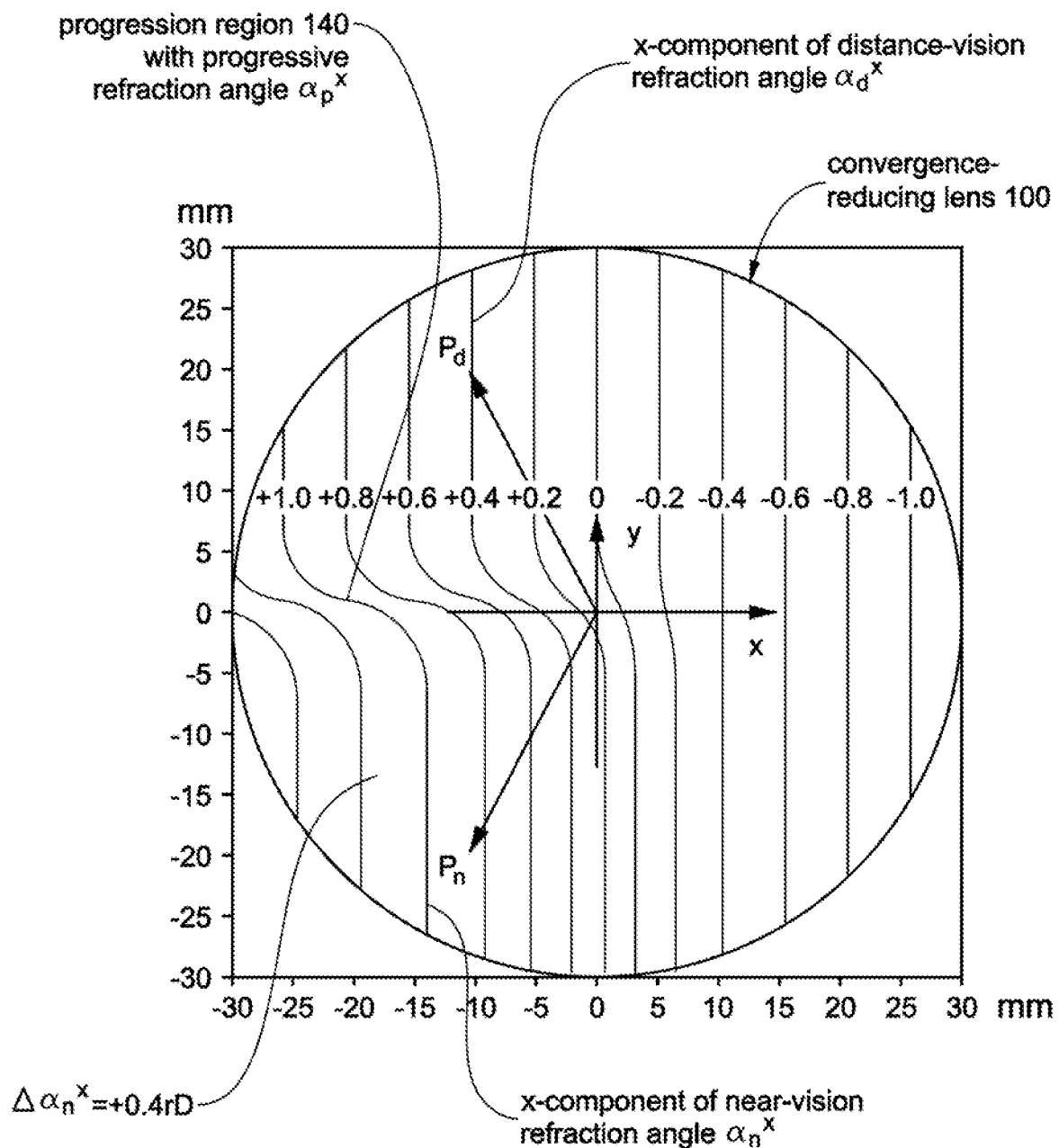
FIGS. 7A-B illustrate contour-representations of various convergence-reducing lenses.
Figure 7B:
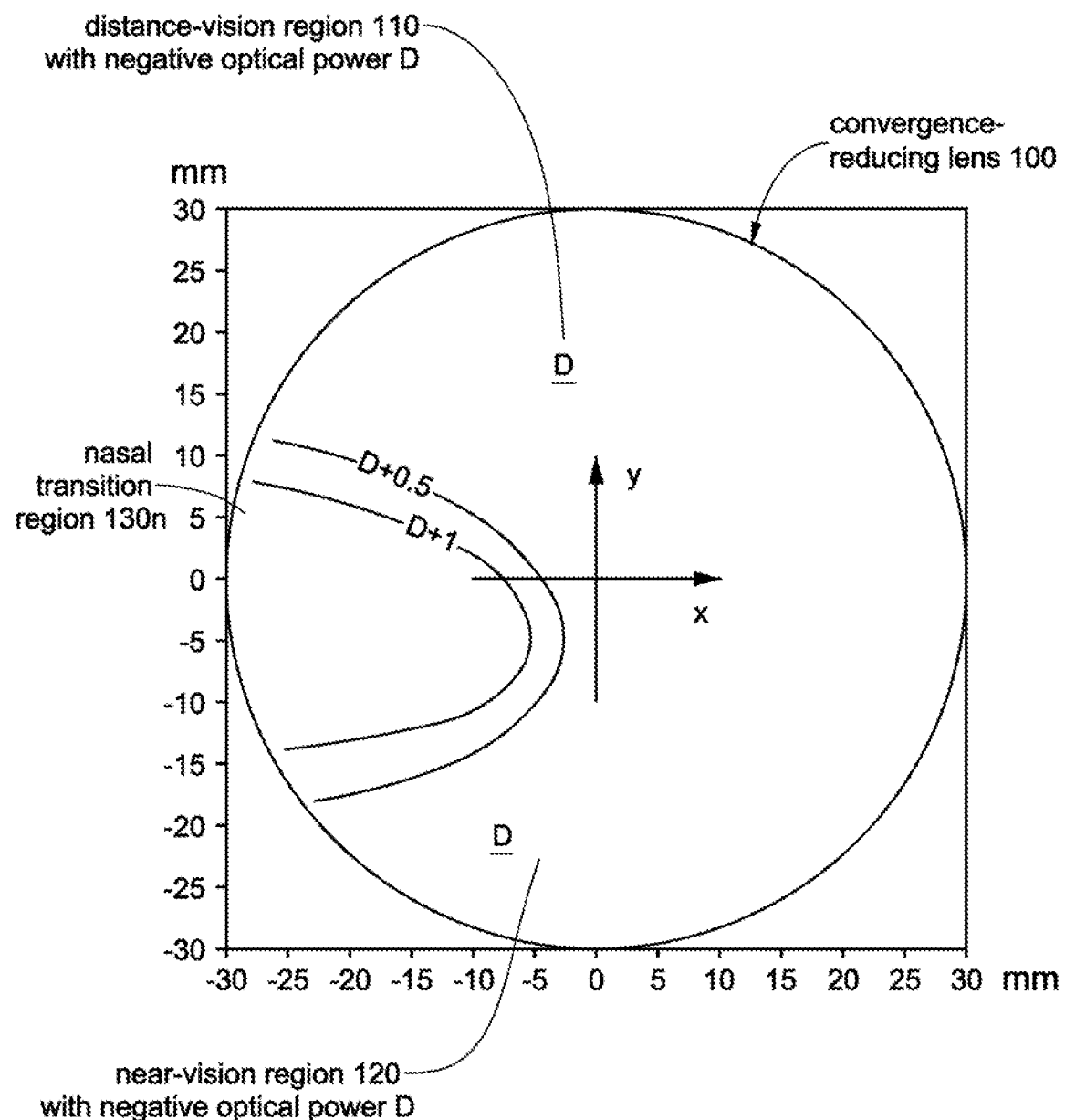

FIGS. 7A-B illustrate a frontal view of an embodiment of the convergence-reducing lens 100, looking onto the x-y plane of the lens from the z-axis direction. FIG. 7A shows iso-$\alpha^x$ refraction angle contour lines of the convergence-reducing lens 100. In the shown convergence-reducing lens 100, $\alpha_d^x$, the x component of the refraction angle $\alpha$ in the distance-vision region 110 follows Eq. (3), while $\alpha_n^x$, the x component of the refraction angle $\alpha$ in the near-vision region 120 introduces a +0.4 rD (refractive diopter) shift in the lower-nasal quadrant: $\alpha_n^x=\alpha_d^x+0.4$ rD, or, equivalently: $\Delta\alpha_n^x=+0.4$ rD. This can be seen from the vertical iso-$\alpha^x$ contours in the near-vision region 120 aligning with the iso-$\alpha^x$ contours in the distance-vision region 110 with a shift by two lines to the right.

The convergence-reducing lens 100 can also include a progression region 140, where the x component of the refraction angle $\alpha_p^x$ varies from $\alpha_d^x$ values related to the distance-vision region 110 to $\alpha_n^x$ values related to the near-vision region 120. The progression region 140 is shaped such that $\alpha_p^x$, the x component of the refraction angle $\alpha$ in the progression region 140 smoothly interpolates between $\alpha_d^x$ and $\alpha_n^x$: $\alpha_d^x<\alpha_p^x<\alpha_n^x$. Further, this progression region 140, at least partially between the distance-vision region 110 and the near-vision region 120, can be configured to refract the light ray 2, directed by the source 11 at a progression region point $P_p$ at a progression x-distance $x_{Pp}$ to propagate to the eye-center representative location 8; wherein the progression x-distance $x_{Pp}$ can be between the near-vision x-distance $x_{Pn}$ and the distance-vision x-distance $x_{Pd}$: $x_{Pn}<x_{Pp}<x_{Pd}$. Finally and correspondingly, the gaze convergence angle $\beta_p$ of the progression region 140 can also smoothly interpolate between its values in the distance-vision region 110 and the near-vision region 120: $\beta_n<\beta_p<\beta_d$.

FIG. 7B shows iso-dioptric contour lines of the optical power in the converge-reducing lens 100 of FIG. 7A. In some embodiments of the convergence-reducing lens 100, the distance-vision region 110 can have a distance-vision negative optical power of D diopters. The near-vision region 120 can have a near-vision optical power that snatches the distance-vision optical power within 0.5 D; and a transition region that can connect the distance-vision region 110 and the near-vision region 120. In some embodiments, the near-vision optical power can match the distance-vision optical power within 0.25 D. In progressive power lenses, the transition region is introduced to smoothly interpolate the optical power between the distance-vision optical power and the different, near-vision optical power, thereby reducing the optical distortions. In the present convergence-reducing lenses 100, the origin of the transition region is different: its optical power is not necessitated by an optical power change, it is only induced by the varying progression region refraction angle $\alpha_p^x$. In the shown case, the location of the transition region is primarily nasal, and hence it is denoted as a nasal transition region 130n. In some embodiments, the transition region can have both nasal and temporal regions. In general, the progression region 140 of FIG. 7A only correlates but does not necessarily coincide with the nasal transition region 130n of FIG. 7B.

In some embodiments, an area of the near-vision region 120 can be greater than 5 mm². In some embodiments, the area of the near-vision region 120 can be greater than 10 mm².

Figure 8A:
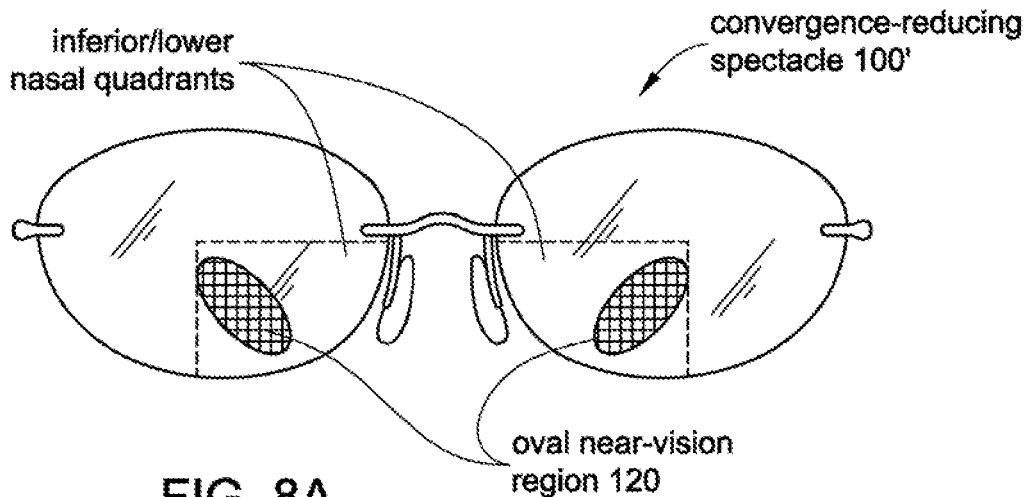
FIGS. 8A-C illustrate various designs of the near-vision region in convergence-reducing lenses.
Figure 8B:
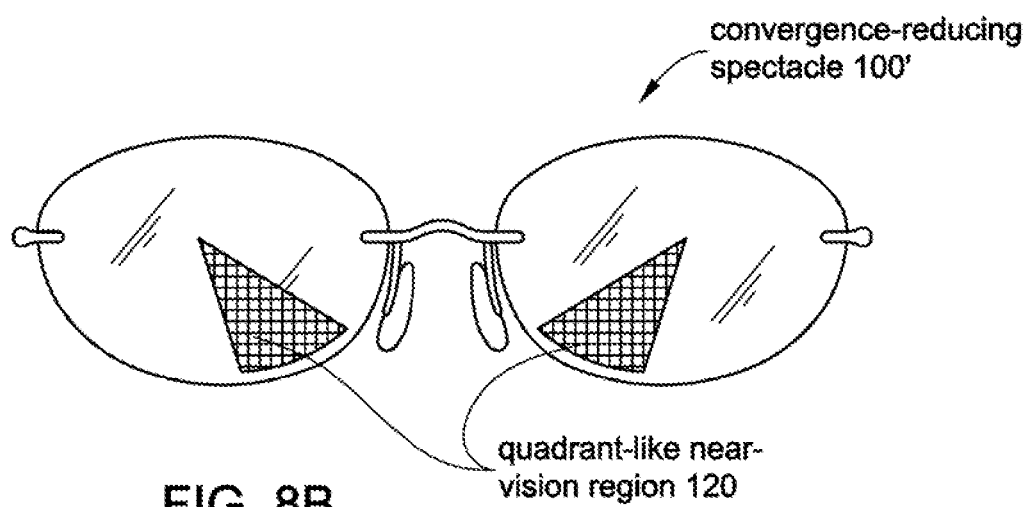
Figure 8C:
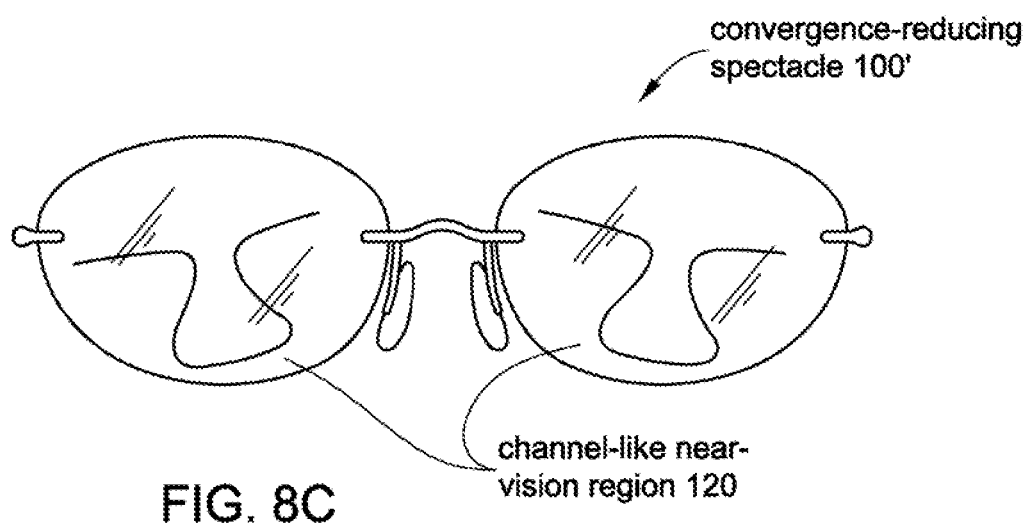

FIGS. 8A-C illustrate various designs of the convergence reducing spectacles 100'. In general, the majority of the near-vision region 120 can occupy the lower, or inferior nasal quadrant of the convergence-reducing lens 100. In some embodiments, a minor portion of the near-vision region 120 can extend to the lower temporal quadrant as well, as shown.

FIG. 8A illustrates that in some embodiments the near-vision region 120 can be an oval. FIG. 8B shows a near-vision region 120 shaped as a quadrant. Finally, FIG. 8C shows a channel-like near-vision region 120. In other embodiments, the near-vision region 120 can have additional shapes, including a triangle, a rectangle, an elongated region, a diagonal region, or a corridor. In yet other embodiments, the near-vision region can be essentially circular, or a downward-pointing D shape.

Figure 9A:
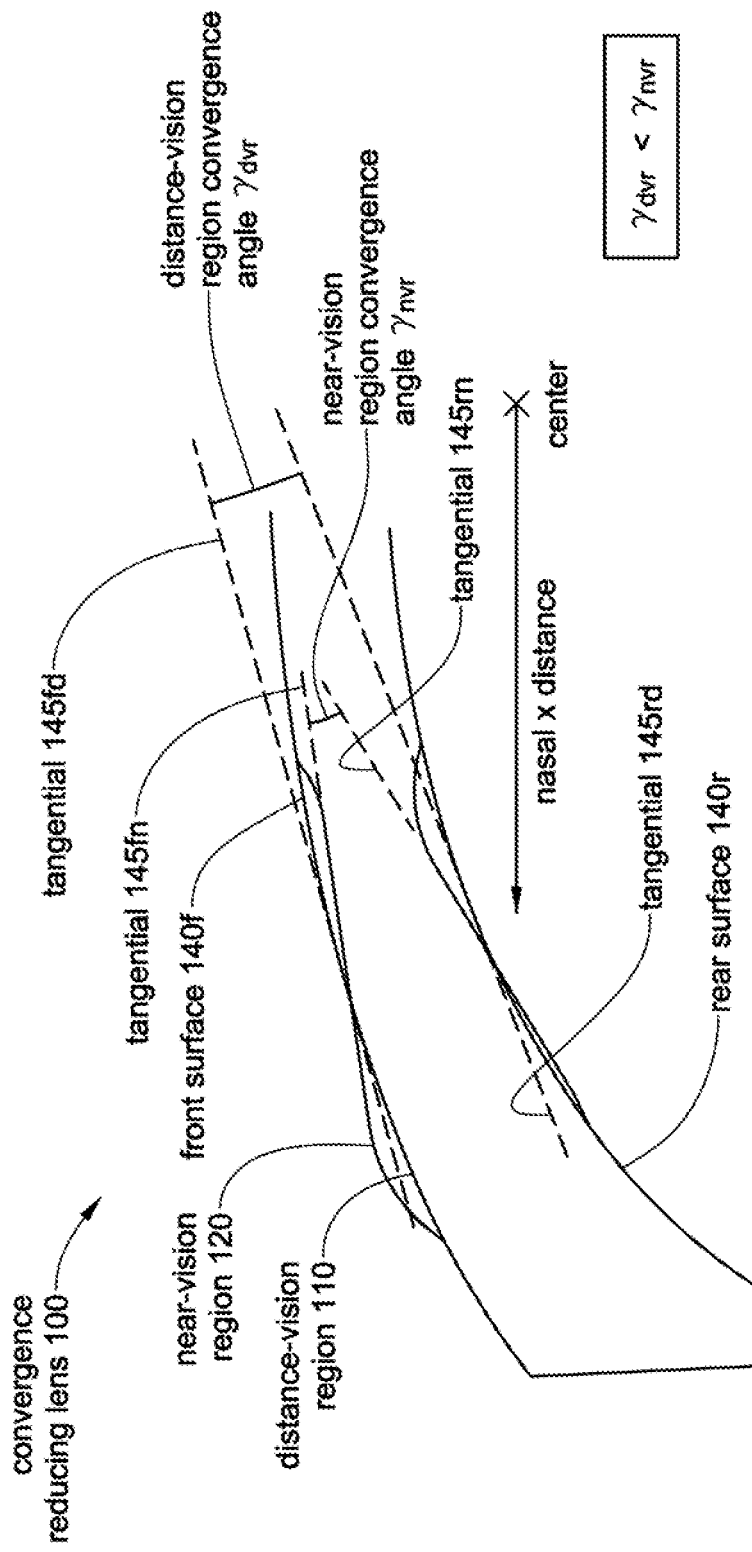
FIGS. 9A-B illustrate z-axis perspectives of convergence-reducing lenses.
Figure 9B:
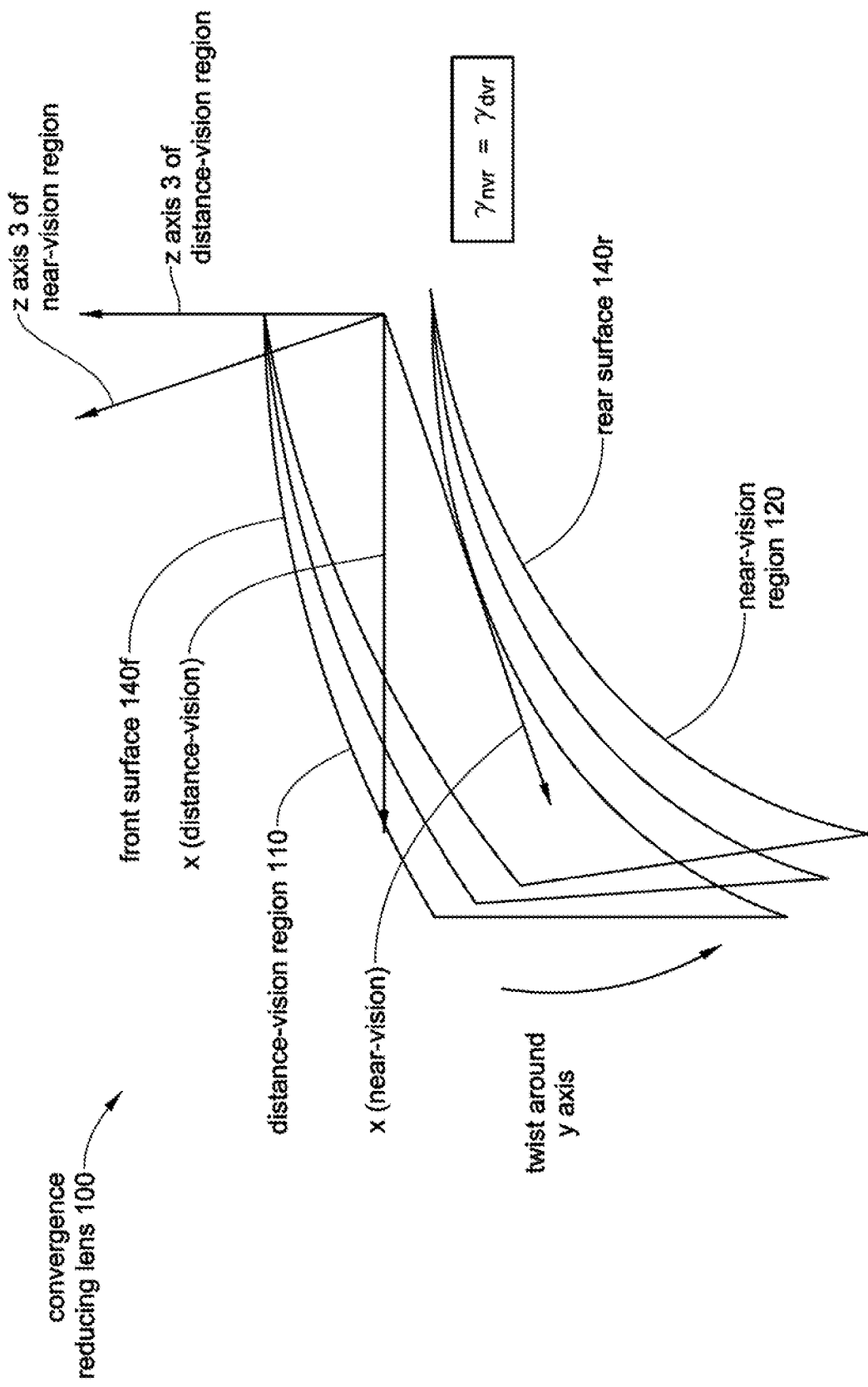

FIGS. 9A-B illustrate two embodiments of the convergence-reducing lens 100 that can achieve and deliver the above described properties of the convergence-reducing lens 100, in particular, that show configurations and designs of lenses 100 that satisfy at least one of the earlier described three inequalities (4)-(6).

FIG. 9A illustrates that embodiments of the convergence-reducing lens 100 can include a front surface 140$f$, with a distance-vision front-tangential 145$fd$ that touches the front surface 140$f$ in the distance-vision region 110 at a nasal x-distance from the center of the coordinate system; and a near-vision front-tangential 145$fn$ that touches the front surface 140$f$ in the near-vision region 120 at the same nasal x-distance but at a corresponding, typically lower y height. (For transparency, the tangentials are differentiated only by their labels.) The convergence-reducing lens 100 can also include a rear surface 140$r$, with a distance-vision rear-tangential 145$rd$ that touches the rear surface 140$r$ in the distance-vision region 110 at the same x-distance, and a near-vision rear-tangential 145$rn$ that touches the rear surface 140$r$ in the near-vision region 120 at the same x-distance, at the corresponding, lower y height. These four tangentials 145 are indicated by dashed lines. The distance-vision front-tangential 145$fd$ and the distance-vision rear-tangential 145$rd$ form a distance-vision region convergence angle $\gamma_{dvr}$, while the near-vision front-tangential 145$fn$ and the near-vision rear-tangential 145$rn$ form a near-vision region convergence angle $\gamma_{nvr}$. In FIG. 9A, the front and rear surfaces 140$f$ and 140$r$ in the near-vision region 120 are inward-rotated close to the center of the lens 100 relative to the distance-vision region 110, and therefore the near-vision region convergence angle $\gamma_{nvr}$ is greater than the distance-vision region convergence angle $\gamma_{dvr}$:

$$\gamma_{dvr} < \gamma_{nvr}. \quad (7)$$

This inequality is one way to design a convergence-reducing lens 100 that achieves at least one of the three inequalities (4)-(6). Several other designs can be consistent with this inequality also. In some cases, the inequality of the angles in inequality (7) can be solely driven by only one of the tangentials being different, such as the near-vision front-tangential 145$fn$ being inward-rotated relative to the distance-vision front-tangential 145$fd$, while the rear tangentials 145$rn$ and 145$rd$ being the same.

In some cases, the convergence-reducing lens 100 can be a meniscus lens 100, as shown. It is also noted that these angles $\gamma_{nvr}$ and $\gamma_{dvr}$ depend on the x-distance where the tangentials were fitted to the surfaces 140$r$ and 140$f$: $\gamma_{nvr} = \gamma_{nvr}(x)$, and $\gamma_{dvr} = \gamma_{dvr}(x)$. The angles $\gamma_{nvr}(x)$ and $\gamma_{dvr}(x)$ are to be determined and compared at the same nasal x-distances from the center of the coordinate system.

FIG. 9B shows another lens design of the convergence-reducing lens 100 that achieves at least one of the three inequalities (4)-(6) in another manner. In this design:

$$\gamma_{nvr} = \gamma_{dvr}. \quad (8)$$

Instead of modifying the surface tangentials, in these embodiments the distance-vision region 110 has a distance-vision z-axis 3; the near-vision region 120 has a near-vision z-axis 3 and the near-vision z-axis 3 is angled, rotated, or twisted, in a nasal direction relative to the distance-vision z-axis 3. The twist is illustrated from looking down on the lens from the +y axis direction. The distance-vision z-axis 3 at the highest y heights of the lens 100 where the distance-vision region 110 is naturally located, can be essentially parallel to the overall lens z-axis 3. Progressing towards lower y heights, where the near-vision region 120 is naturally located, the x-y plane of the lens is getting rotated so that the z-axis 3 is rotated in the nasal direction. Two of the rotated, or twisted cross sections are shown in FIG. 9B. The middle cross section may correspond to the progression region 140, and the bottom, most twisted cross section can correspond to the near-vision region 120, with its twisted near-vision z-axis. In an alternative notation, the z axis 3 in the near vision region 120 is rotated counter-clockwise relative to the z axis 3 in the distance-vision region 110.

It is noted that a manufacturing process of the embodiment of FIG. 9B may be remarkably easy as the process may involve forming a lens with the desired optical powers and then warming the lens until its material softens to a degree that allows a twisting of the convergence-reducing lens 100 and its z axis 3 in the intended near vision region 120 by the desired degree. Obviously, some convergence-reducing lenses 100 can be formed by combining the embodiments of FIG. 9A and FIG. 9B.

Figure 6A:
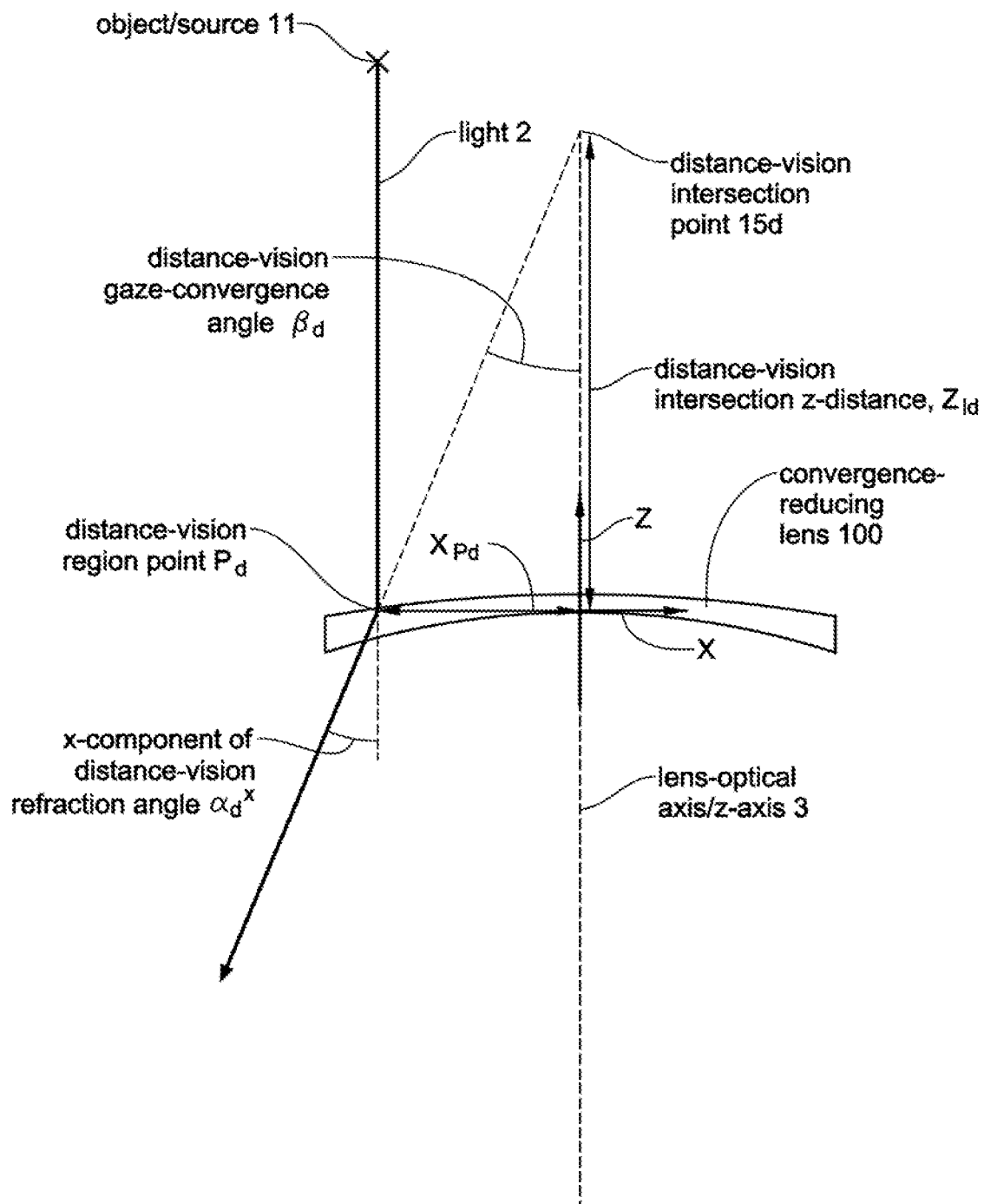
FIGS. 6A-D illustrate aspects of light propagation as impacted by convergence-reducing lenses.

Next, the embodiments of FIGS. 6A-D will be described. FIG. 6A shows that embodiments of the convergence-reducing lens 100 can include a distance-vision region 110, having a negative distance-vision optical power, that is configured to refract a light ray 2, directed parallel to the z-axis 3 at a distance-vision region point $P_d$ at an x-distance $x_{Pd}$ from a y-z plane of the coordinate system, so that its extension (dashed line) intersects the y-z plane at a distance-vision intersection z-distance $z_{Id}$. The convergence-reducing lens 100 can also include a near-vision region 120, having a near-vision optical power that matches the distance-vision optical power within 0.5 D, that is configured to refract a light ray 2, directed parallel to the z-axis 3 at a near-vision region point $P_n$, at an x-distance $x_{Pn}$ that is equal to $x_{Pd}$ of the distance-vision region point $P_d$: $x_{Pn} = x_{Pd}$, at a corresponding y height, so that its extension intersects the y-z plane at a near-vision intersection z-distance $z_{In}$ that is smaller than the distance-vision intersection z-distance:

$$z_{In} < z_{Id}. \quad (9)$$

In some embodiments of the convergence-reducing lens 100, the distance-vision region 110 can be configured to refract the light ray 2, directed parallel to the z-axis 3 at the distance-vision region point $P_d$ at the x-distance $x_{Pd}$, by a distance-vision refraction angle $\alpha_d$. The near-vision region 120 can be configured to refract the light ray 2, directed parallel to the z-axis 3 at the near-vision region point $P_n$ at the x-distance $x_{Pn}$ ($x_{Pn} = x_{Pd}$), at the corresponding y height, by a near-vision refraction angle $\alpha_n$. In embodiments, $\alpha_n^x$, an x-component of the near-vision refraction angle $\alpha_n$ can be greater than $\alpha_d^x$, an x-component of the distance-vision refraction angle $\alpha_d$:

$$\alpha_d^x < \alpha_n^x. \quad (10)$$

Here and subsequently, the refraction angles $\alpha$ and gaze-convergence angles $\beta$ refer to the magnitude of the angles. In some embodiments of the convergence-reducing lens 100, the distance-vision region 110 can be configured to refract the light ray 2, directed parallel to the z-axis 3 at the distance-vision region point $P_d$ at the x-distance $x_{Pd}$ so that its extension intersects the y-z plane with a distance-vision gaze-convergence angle $\beta_d$. The near-vision region 120 can be configured to refract the light ray 2 directed parallel to the z-axis 3 at the near-vision region point $P_n$, at the same x-distance $x_{Pn} = x_{Pd}$, at the corresponding y height, so that its extension intersects the y-z plane with a near-vision gaze-convergence angle $\beta_n$. In embodiments, the near-vision gaze-convergence angle $\beta_n$ can be greater than the distance-vision gaze-convergence angle $\beta_d$:

$$\beta_d < \beta_n. \tag{11}$$

Figure 6B:
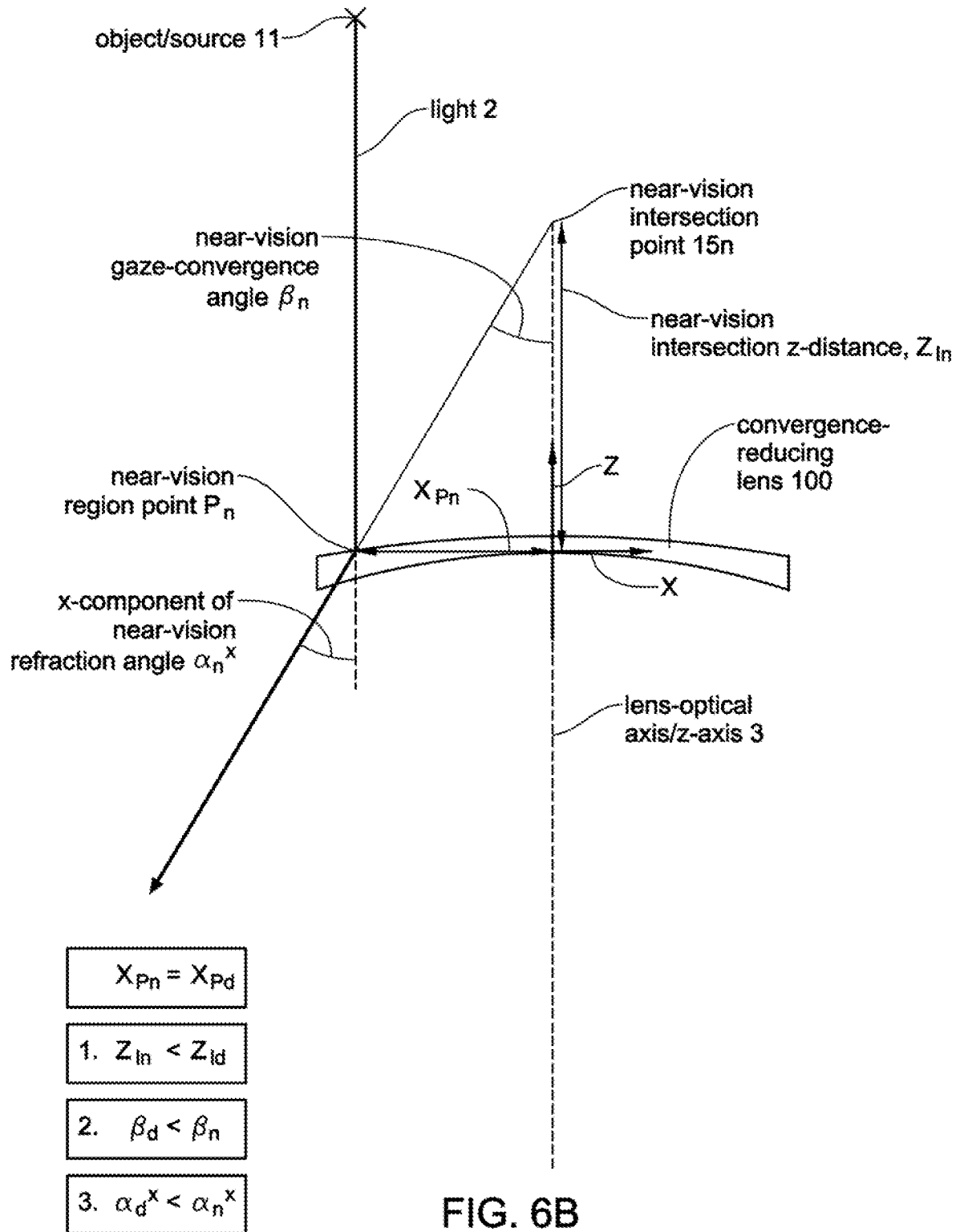

The inequalities (9)-(11) characterize the embodiments of FIGS. 6A-B similarly to the inequalities (4)-(6) characterizing the embodiments of FIGS. 5A-B. Embodiments of the convergence-reducing lens 100 can satisfy at least one of the three inequalities (9)-(11).

As before, embodiments of the convergence-reducing lens 100 can further include a progression region 140, at least partially between the distance-vision region 110 and the near-vision region 120, that is configured to refract a light ray 2, directed parallel to the z-axis 3 at a progression region point $P_p$ at the x-distance $x_{Pp}$ that is the same as of the distance-vision region point $x_{Pp} = x_{Pn} = x_{Pd}$ so that its extension intersects the y-z plane at a progression intersection z-distance $z_{Ip}$ that is between the near-vision intersection z-distance $z_{In}$ and the distance-vision intersection z-distance $z_{Id}$: $z_{In} < z_{Ip} z_{Id}$.

Figure 6C:
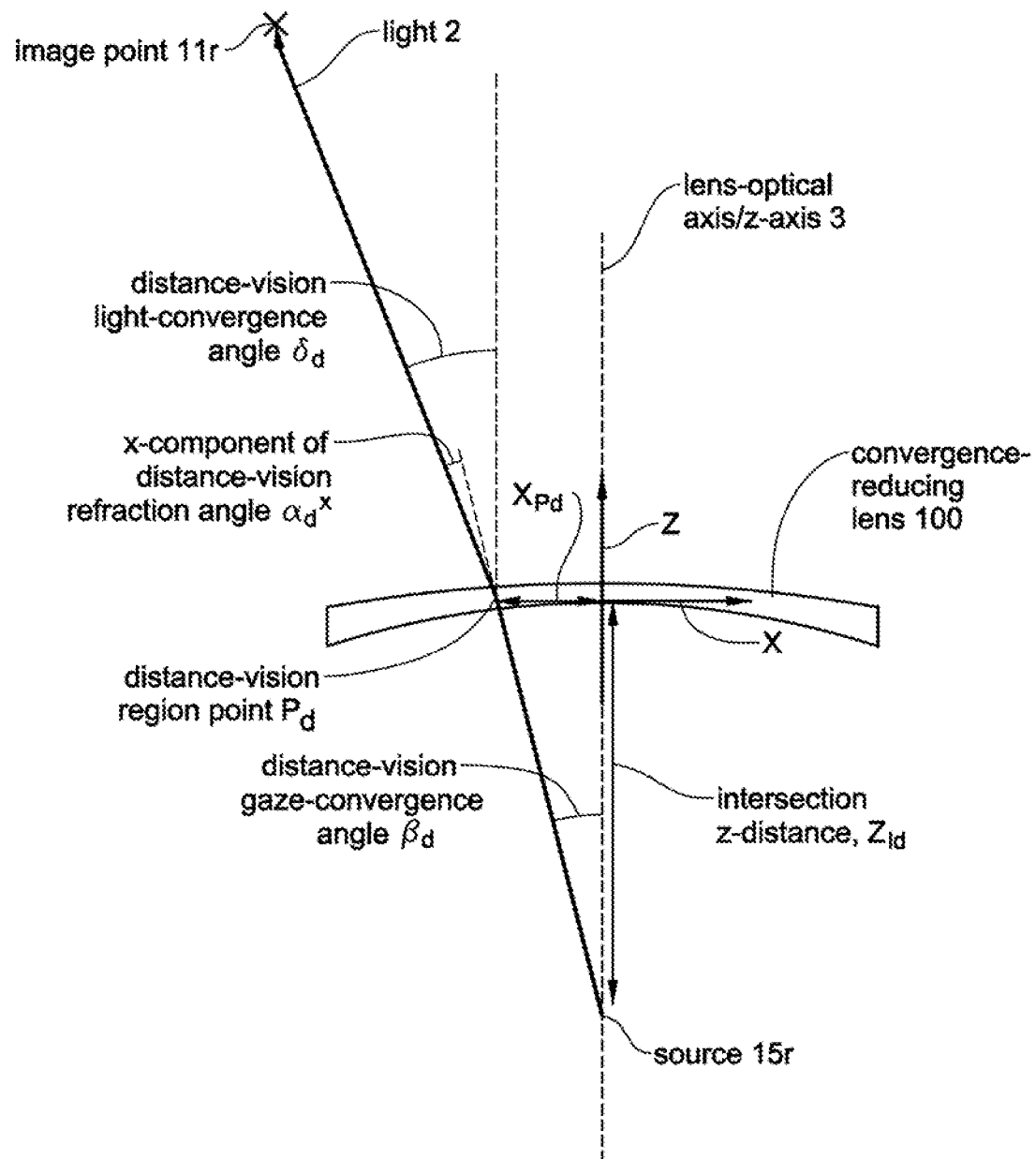
Figure 6D:
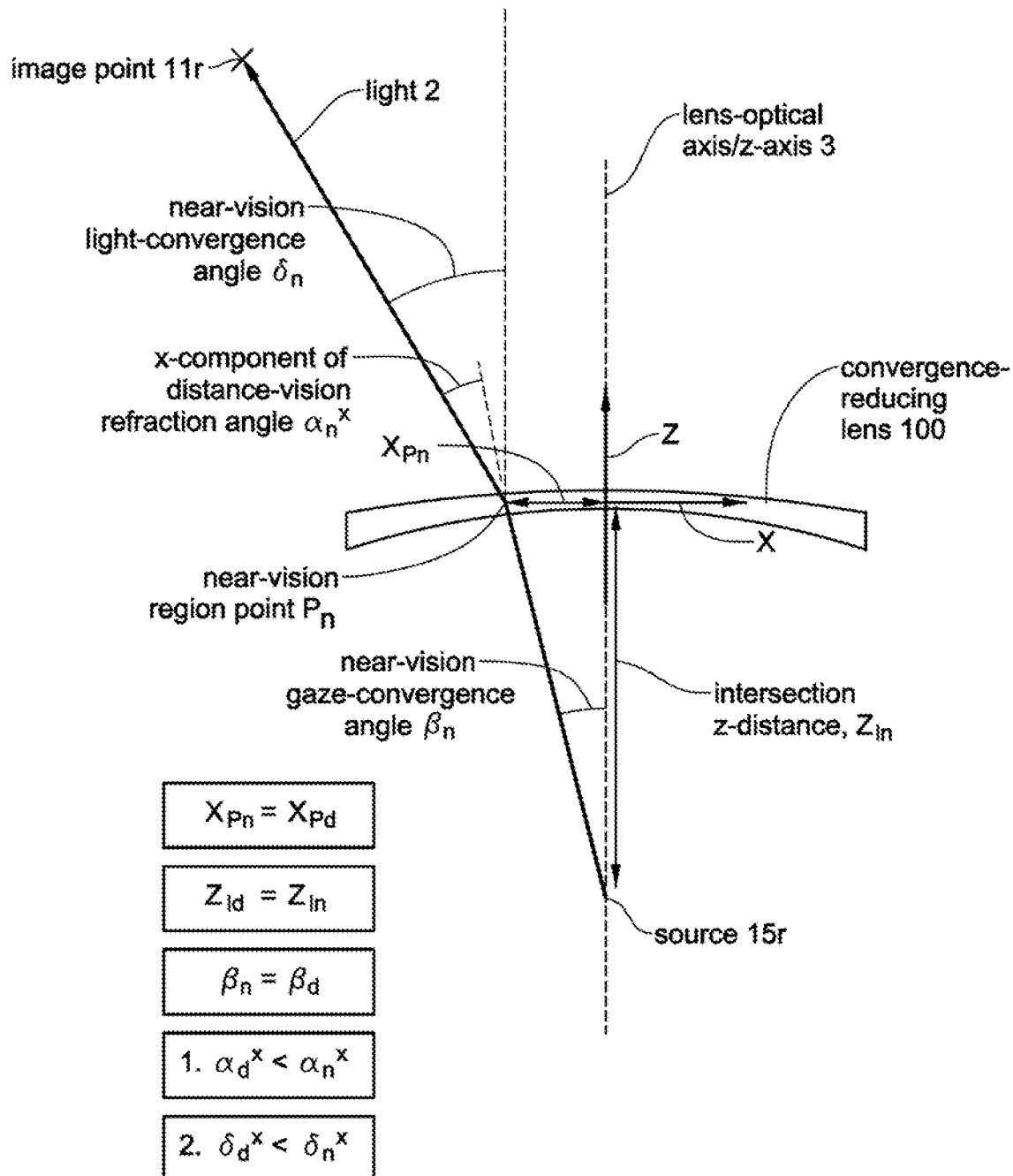

FIGS. 6C-D describe embodiments that are related to the embodiments of FIGS. 6A-B by reversing the path of the light rays 2, albeit with some necessary adjustments. FIG. 6C illustrates that embodiments of the convergence-reducing lens 100 can include a distance-vision region 110, having a negative distance-vision optical power, configured to refract a light ray 2, directed by a source 15r at a distance-vision region point $P_d$ at an x-distance $x_{Pd}$ from a y-z plane of the coordinate system, to form a distance-vision light-convergence angle $\delta_d$ with the y-z plane, wherein the source 15r is located on the z-axis 3 at an intersection z-distance $z_{Id}$ from a center of the coordinate system. The lens 100 can further include a near-vision region 120, having a near-vision optical power that matches the distance-vision optical power within 0.5 D, that is configured to refract a light ray 2, directed by the source 15r at a near-vision region point $P_n$ at the same x-distance $x_{Pn}$ from the y-z plane of the coordinate system as that of the distance-vision point $P_d$: $x_{Pn} = x_{Pd}$, at a corresponding y height, to form a near-vision light-convergence angle $\delta_n$ with the y-z plane. Here, the source 15r can be at the intersection z-distance $z_{In}$ that is the same $z_{Id}$: $z_{In} = z_{Id}$. Correspondingly, the distance-vision gaze convergence angle $\beta_d$ is also equal to the near-vision gaze convergence angle $\beta_n$: $\beta_d = \beta_n$. In such embodiments, $\delta_n^x$, an x-component of the near-vision light-convergence angle $\delta_n$ can be greater than $\delta_d^x$, an x-component of the distance-vision light-convergence angle $\delta_d$:

$$\delta_d^x < \delta_n^x. \tag{12}$$

Correspondingly, in some embodiments of the convergence-reducing lens 100, the distance-vision region 110 can be configured to refract the light ray 2, directed by the source 15r at the distance-vision region point $P_d$ at $x_{Pd}$, the x-distance from the y-z plane of the coordinate system, by a distance-vision refraction angle $\alpha_d$. Further, the near-vision region 120 can be configured to refract a light ray 2, directed by the source 15r at the near-vision region point $P_n$ at $x_{Pn}$, the x-distance from the y-z plane of the coordinate system, at the corresponding y height, by a near-vision refraction angle $\alpha_n$. In embodiments, $\alpha_n^x$, an x-component of the near-vision refraction angle $\alpha_n$ can be greater than $\alpha_d^x$, an x-component of the distance-vision refraction angle $\alpha_d$:

$$\alpha_d^x < \alpha_n^x. \tag{13}$$

Inequalities (12)-(13) characterize the embodiments of FIGS. 6C-D analogously to inequalities (4)-(6) characterizing the embodiments of FIGS. 5C-D. Several disclosed characteristics of the embodiments of FIGS. 5A-D also apply to the embodiments of FIGS. 6A-D.

Figure 10A:
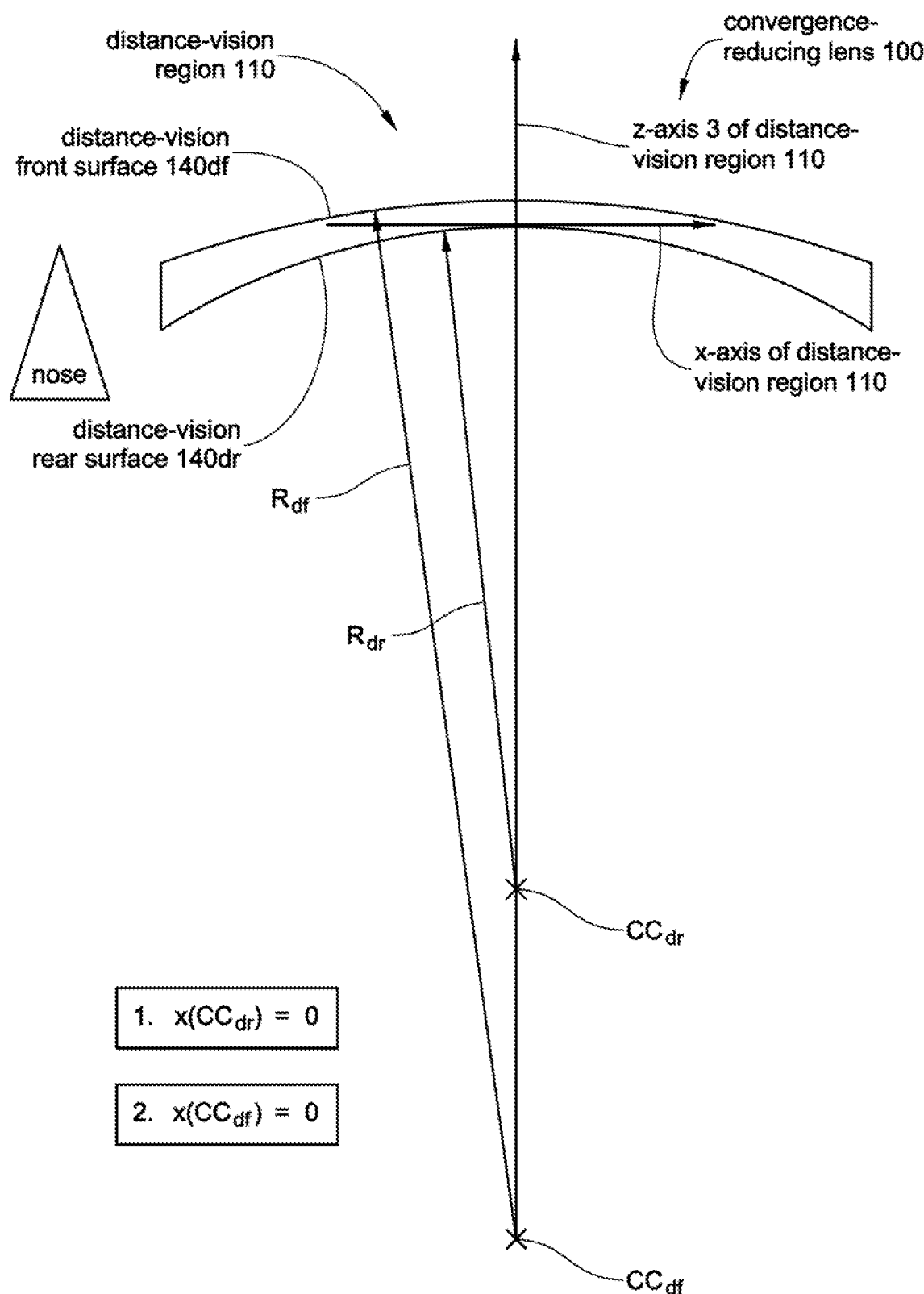
FIGS. 10A-B illustrate off-axis centers of curvatures in various embodiments of the convergence-reducing lens.
Figure 10B:
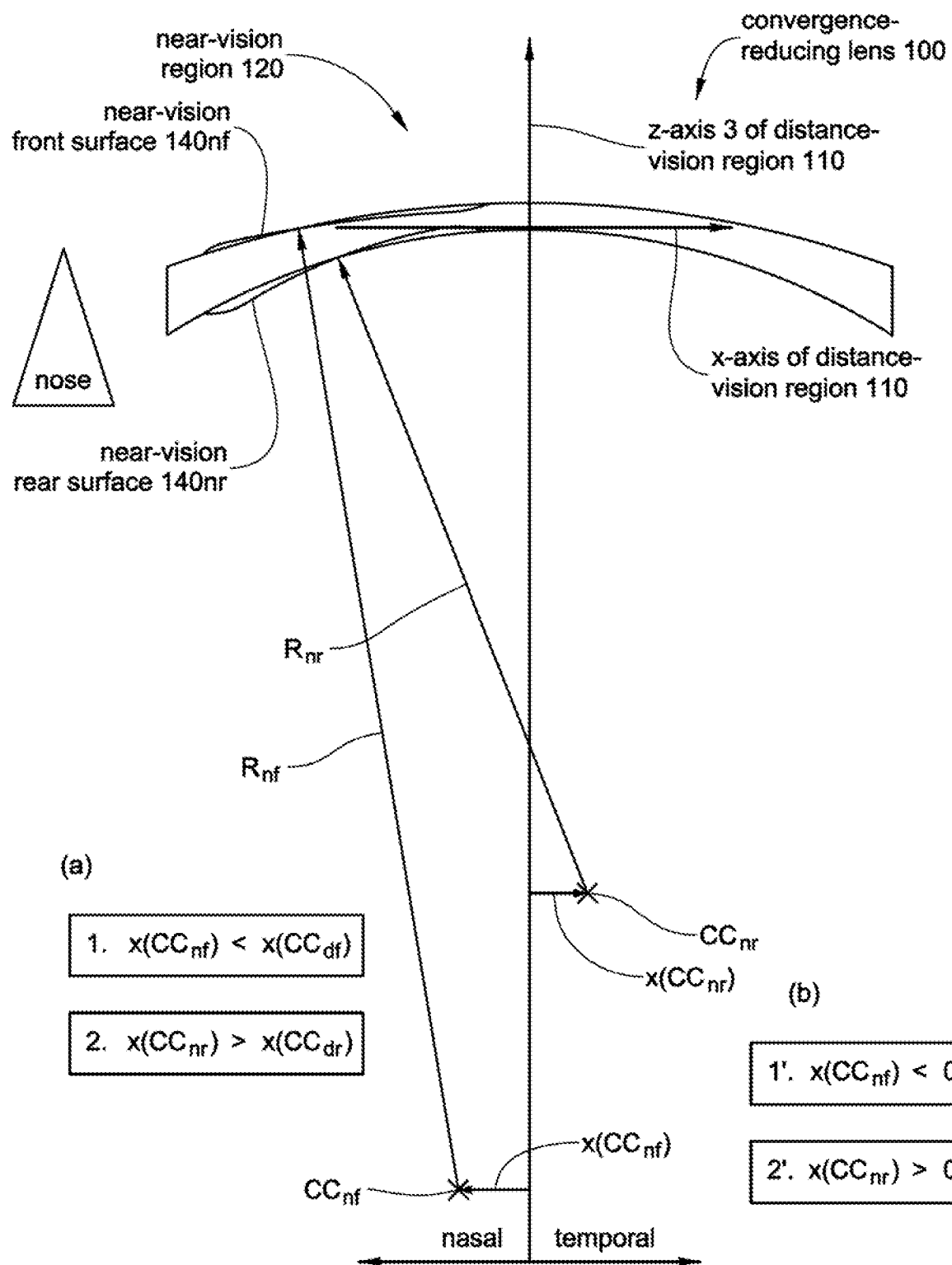

FIGS. 10A-B show yet other embodiments of the eye-strain reducing lens 100, or convergence-reducing lens 100. These embodiments can be characterized via a description of the curvatures of the lens surfaces and the off-center locations of their corresponding centers of curvatures. In some detail, embodiments of the eye-strain-reducing lens 100, or convergence-reducing lens 100 can have a central normal of the convergence-reducing, lens that defines a z-axis 3. The z-axis 3 is typically also the z-axis 3 of a distance-vision region 110. A central region of the convergence-reducing lens 100 can further define a tangential, centered x-y plane. The z-axis 3 and the x-y plane together define an x-y-z coordinate system.

The convergence-reducing lens 100 can include the above-mentioned distance-vision region 110 with a negative distance-vision optical power, having a distance-vision front surface 140df with a radius of curvature $R_{df}$ and a center of distance-vision front curvature $CC_{df}$ and a distance-vision rear surface 140dr with a radius of curvature $R_{dr}$ and a center of distance-vision rear curvature $CC_{dr}$. The convergence-reducing lens 100 can further include a near-vision region 120 with an optical power within 0.5 D of the distance-vision optical power, having a near-vision front surface 140nf with a radius of curvature $R_{nf}$ and a center of near-vision front curvature $CC_{nf}$ and a near-vision rear surface 140nr with a radius of curvature $R_{nr}$ and a center of near-vision rear curvature $CC_{nr}$; wherein an x-coordinate of the center of near-vision front curvature $x(CC_{nf})$ can be nasal relative to an x-coordinate of the center of distance-vision front curvature $x(CC_{df})$, or an x-coordinate of the center of near-vision rear curvature $x(CC_{nr})$ can be temporal relative to an x-coordinate of the center of distance-vision rear curvature $x(CC_{dr})$. Expressing the above attributes in inequalities, and using the directionality of the x-axis, such that points lying to the right, temporal direction have greater x coordinates than points lying to the left, nasal direction, these conditions can be written as:

$$x(CC_{nf}) < x(CC_{df}), \text{ or} \tag{14}$$

$$x(CC_{nr}) > x(CC_{dr}). \tag{15}$$

FIG. 10A shows that in some typical embodiments, the $CC_{df}$ front and $CC_{dr}$ rear centers of curvature of the distance-vision surfaces 140df and 140dr are located on the z-axis 3, and therefore their x coordinates are zero. In formal terms, $x(CC_{df}) = x(CC_{dr}) = 0$. In such embodiments, the convergence-reducing lens 100 can be configured so that $x(CC_{nf})$, the x-coordinate of the center of near-vision front curvature $CC_{nf}$, is nasal relative to the z-axis 3 of the coordinate system, i.e.:

$$x(CC_{nf}) < 0, \text{ or} \tag{16}$$

$x(CC_{nr})$, the x-coordinate of the center of near-vision rear curvature is temporal relative to the z-axis 3 of the coordinate system, i.e.

$$x(CC_{nr}) > 0. \tag{17}$$

In this sense, embodiments of the convergence-reducing lens 100 are off-axis center of curvature lenses. As before, a y height corresponding to the near-vision region 120 and its surfaces 140nf and 140nr can be lower than a y height of the distance vision region 110 and its surfaces 140df and 140dr.

The above-described coordinates and x-distances of the centers of curvature $x(CC_{nf})$, $x(CC_{nr})$, $x(CC_{df})$, and $x(CC_{dr})$ can be determined with specialized tools and devices, such as spherometers and lens profilometers.

Designs of the convergence-reducing lens 100 can achieve the optical power of the near-vision region 120 to match the optical power of the distance-vision region 110 within 0.5 D, in spite of the centers of curvature being off-axis. This is so because the optical power in first approximation is given only by the radii of curvature of the lens front and rear surfaces, not the location of the centers of curvature: Optical power (distance-vision)=$f(R_{df}, R_{dr})$, and Optical power (near-vision)=$f(R_{nf}, R_{nr})$. In the thin lens approximation, the optical power is proportional to $f(R_1, R_2)$=$(n-1)(1/R_1-1/R_2)$. As long as $f(R_{nf}, R_{nr})$=$f(R_{df}, R_{dr})$, the optical powers in the two regions are matching in a leading order approximation.

Designs of the convergence-reducing lens 100 can be viewed as built on the recognition that it is possible to leave the optical power of the near-vision region 120 essentially equal to that of the optical power of the distance-vision region 110 by not manipulating the radii of the corresponding curvatures, yet, to adjust and manipulate the near-vision refraction angles relative to the distance-vision refraction angles by moving the centers of curvature off the z-axis 3 of the convergence-reducing lens 100. More concisely, in designs of the convergence-reducing lens 100 it is possible to form the refraction angles $\alpha_n^x$ of the near-vision region 120 different from the refraction angles $\alpha_d^x$ of the distance-vision region 110, while preserving that the optical power of the near-vision region 120 remains matching of the optical power of the distance-vision region 110. The refraction angles and the optical powers of these two regions are adjustable relatively independently from each other, in leading order of the off-center displacements.

Some embodiments of these convergence-reducing lenses 100 Can be further characterized as follows. With reference to FIG. 9A, the distance-vision front surface 140df and the distance-vision rear surface 140dr, at an x-distance from a center of the coordinate system, can define a distance-vision surface convergence angle $\gamma_{dvr}$; and the near-vision front surface 140nf and the near-vision rear surface 140nr at the same x-distance from the center of the coordinate system, at the corresponding y height, can define a near-vision surface convergence angle $\gamma_{nvr}$, wherein in embodiments the near-vision surface convergence angle is greater than the distance-vision surface convergence angle:

$$\gamma_{dvr} < \gamma_{nvr}. \tag{18}$$

The off-axis curvature center, convergence-reducing lenses 100 of FIGS. 10A-B can be further characterized by, and combined with, the embodiments described in relation to FIGS. 5-9.

It is noted that the near-vision region 120 of the convergence-reducing lenses 100 of FIGS. 5-10 can be formed by modifying only the lens rear surface 140nr to create the near-vision rear surface 140nr, or only the lens front surface 140nf to create the near-vision front surface 140nf, or both.

The near-vision region 120 can be formed by a variety of methods. Some techniques may use a free-form generator, or' five-axis generator. Other techniques may use a 3 dimensional (3D) printer. Finally, in some cases, the shape of the near-vision region 120 may not differ from the distance-vision region 110. Rather, the different optical performance of these regions can be achieved by modulating the index of refraction n of the lens material differently in these regions. For example, $n_n$, the index of refraction in the near-vision region 120 can be larger than $n_d$, the index of refraction in the distance-vision region: $n_n > n_d$. Such embodiments of the convergence-reducing lens 100 can deliver many of the optical performances described in relation to FIGS. 5-10. In some cases, such a change of the index of refraction n can be achieved by applying an electrical field during the molding process of the lens.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in sonic cases be excised from the combination, and the claimed combination may be directed to a subcombination or a variation of a subcombination.

The invention claimed is:

1. An eye-strain-reducing lens, wherein:
   a central normal of the eye-strain-reducing lens defines a z-axis, and a central region of the eye-strain-reducing lens defines a tangential, centered x-y plane, together defining an x-y-z coordinate system of the eye-strain-reducing lens, the eye-strain-reducing lens comprising
   a distance-vision region, having a negative distance-vision optical power, configured to refract a light ray, directed by a point source at a distance-vision region point at a distance-vision x-distance from a center of the coordinate system, to propagate to an eye-center-representative location; and
   a near-vision region, having a near-vision optical power that matches the distance-vision optical power, configured to refract a light ray, directed by the source at a near-vision region point at a near-vision x-distance from the center of the coordinate system, to propagate to an x-z location of the eye-center representative location at a corresponding y height; wherein
   the near-vision x-distance is smaller than the distance-vision x-distance; and
   the x-axis is approximately horizontal when the eye-strain-reducing lens is included in a spectacle.

2. The eye-strain-reducing lens of claim 1, wherein:
   the distance-vision region is configured to refract the light ray, directed by the source at the distance-vision region point at the distance-vision x-distance to intersect a y-z plane of the coordinate system with a distance-vision gaze-convergence angle;
   the near-vision region is configured to refract the light ray, directed by the source at the near-vision region point at the near-vision x-distance, to intersect the y-z plane with a near-vision gaze-convergence angle; and
   the near-vision gaze-convergence angle is smaller than the distance-vision gaze-convergence angle.

3. The eye-strain-reducing lens of claim 1, wherein:
   the distance-vision region is configured to refract the light ray, directed by the source at the distance-vision region point at the distance-vision x-distance, by a distance-vision refraction angle;
   the near-vision region is configured to refract the light ray, directed by the source at the near-vision region point at the near-vision x-distance, by a near-vision refraction angle; and an x-component of the near-vision retraction angle is greater than an x-component of the distance-vision refraction angle.

4. The eye-strain-reducing lens of claim 1, comprising;
a progression region, at least partially between the distance-vision region and the near-vision region, configured to retract a light ray, directed by the source, at a progression region point at a progression x-distance, to propagate to the eye-center representative location; wherein
the progression x-distance is between the near-vision x-distance and the distance-vision x-distance.

5. The eye-strain-reducing lens of claim 1, wherein:
the source is located
at a source x-distance from the z-axis of the coordinate system that is greater than a radius of the eye-strain-reducing lens; and
at a source z-distance that is between 10 cm and 100 cm.

6. The eye-strain-reducing lens of claim 1, wherein:
the eye-center representative location is on the z-axis, at a z-distance in the range of 15-25 mm from the center of the coordinate system in a direction that is opposite to the direction of the source.

7. The eye-strain-reducing lens of claim 1, wherein:
the near-vision region has an area greater than 5 mm$^2$.

8. The eye-strain-reducing lens of claim 1, wherein:
the near-vision optical power matches the distance-vision optical power within 0.25 D.

9. The eye-strain-reducing lens of claim 1, comprising:
a front surface, having
a distance-vision front-tangential, touching the front surface in the distance-vision region at a nasal x-distance from the center of the coordinate system, and
a near-vision front-tangential, touching the front surface in the near-vision region at the nasal x-distance and at a corresponding y height; and
a rear surface, having
a distance-vision rear-tangential, touching the rear surface in the distance-vision region at the nasal x-distance, and
a near-vision rear-tangential, touching the rear surface in the near-vision region at the nasal x-distance and at the corresponding y height; wherein
the distance-vision front-tangential and the distance-vision rear-tangential form a distance-vision surface convergence angle, and
the near-vision front-tangential and the near-vision rear-tangential form a near-vision surface convergence angle, wherein
the near-vision surface convergence angle is grater than the distance-vision surface convergence angle.

10. The eye-strain-reducing lens of claim 1, wherein:
the distance-vision region has a distance-vision z-axis;
the near-vision region has a near-vision z-axis, wherein the near-vision z-axis is rotated in a nasal direction relative to the distance-vision z-axis.

11. The eye-strain-reducing lens of claim 1, wherein:
the near-vision x-distance is smaller than the distance-vision x-distance as determined by at least one of an image-adjusting protocol, a lens-adjusting protocol, and a source-adjusting protocol.

12. The eye-strain-reducing lens of claim 1, wherein:
at least one of the distance-vision region and the near-vision region has at least one of an aspheric component, a power-neutral component, a cylinder, a coma, and an astigmatic component.

13. A eye-strain-reducing lens, wherein:
a central normal of the eye-strain-reducing lens defines a z-axis, and a central region of the eye-strain-reducing lens defines a tangential, centered x-y plane, together defining an x-y-z coordinate system of the eye-strain-reducing lens, the eye-strain-reducing lens comprising
a distance-vision region, having a negative distance-vision optical power, configured to refract a light ray directed by a point source at a distance-vision region point at a distance-vision x-distance from a center of the coordinate system, to propagate to an image point, wherein the source is located on the z-axis at a source-z-distance from the center of the coordinate system; and
a near-vision region, having a near-vision optical power that matches the distance-vision optical power, configured to refract a light ray directed by the source at a near-vision region point at a near-vision x-distance from the center of the coordinate system to propagate to an x-z location of the image point at a corresponding y height, wherein
the near-vision x-distance is smaller than the distance-vision x-distance; and
the x-axis is approximately horizontal when the eye-strain-reducing lens is included in a spectacle.

14. The eye-strain-reducing lens of claim 13, wherein:
the distance-vision region is configured so that the source directs the light ray to propagate to the image point via a refraction at the distance-vision region point by directing the light ray with a distance-vision gaze-convergence angle relative to a y-z plane of the coordinate system;
the near-vision region is configured so that the source directs the light ray to propagate to the x-z location of the image point, at the corresponding y height, via a refraction at the near-vision region point by directing the light ray with a near-vision gaze-convergence angle relative to the y-z plane of the coordinate system; and
the near-vision gaze-convergence angle is smaller than the distance-vision gaze-convergence angle.

15. The eye-strain-reducing lens of claim 13, wherein:
the distance-vision region is configured to refract the light ray, directed by the source at the distance-vision region point to propagate to the image point, by a distance-vision refraction angle;
the near-vision region is configured to refract the light ray, directed by the source at the near-vision region point to propagate to the x-z location of the image point, at the corresponding y height, by a near-vision refraction angle; and
an x-component of the near-vision refraction angle is greater than an x-component of the distance-vision refraction angle.

16. The eye-strain-reducing lens of claim 13, comprising:
a front surface, having
a distance-vision front-tangential at a nasal x-distance from the center of the coordinate system, and
a near-vision front-tangential at the nasal x-distance and at a corresponding y height; and
a rear surface, having
a distance-vision rear-tangential at the nasal x-distance, and
a near-vision rear-tangential at the nasal x-distance and at the corresponding y height; wherein
the distance-vision front-tangential and the distance-vision rear-tangential form a distance-vision surface convergence angle, and the near-vision front-tangential and the near-vision rear-tangential form a near-vision surface convergence angle, wherein
the near-vision surface convergence angle is greater than the distance-vision surface convergence angle.

17. The eye-strain-reducing lens of claim 16, wherein:
the distance-vision region has a distance-vision z-axis;
the near-vision region has a near-vision z-axis, wherein
the near-vision z-axis is rotated in a nasal direction relative to the distance-vision z-axis.

18. The eye-strain-reducing lens of claim 13, wherein:
the near-vision x-distance is smaller than the distance-vision x-distance as determined by at least one of an image-adjusting protocol, a lens-adjusting protocol, and a source-adjusting protocol.

* * * * *

UNITED STATES PATENT AND TRADEMARK OFFICE
CERTIFICATE OF CORRECTION

| | | |
|---|---|---|
| PATENT NO. | : 11,360,329 B2 | Page 1 of 1 |
| APPLICATION NO. | : 15/859660 | |
| DATED | : June 14, 2022 | |
| INVENTOR(S) | : Jeffrey P. Krall and Aric Plumley | |

It is certified that error appears in the above-identified patent and that said Letters Patent is hereby corrected as shown below:

In the Claims

In Column 21, Claim 9, last line, please delete "grater" and replace with --greater--.

Signed and Sealed this
Sixth Day of June, 2023

Katherine Kelly Vidal
*Director of the United States Patent and Trademark Office*